(12) United States Patent
Nakamura et al.

(10) Patent No.: US 10,430,707 B2
(45) Date of Patent: Oct. 1, 2019

(54) INFORMATION PROCESSING DEVICE

(71) Applicant: SONY CORPORATION, Tokyo (JP)

(72) Inventors: Akira Nakamura, Kanagawa (JP); Takuya Narihira, Tokyo (JP); Takuya Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 15/566,327

(22) PCT Filed: Dec. 27, 2016

(86) PCT No.: PCT/JP2016/088889
§ 371 (c)(1),
(2) Date: Oct. 13, 2017

(87) PCT Pub. No.: WO2017/168898
PCT Pub. Date: Oct. 5, 2017

(65) Prior Publication Data
US 2018/0082178 A1 Mar. 22, 2018

(30) Foreign Application Priority Data

Mar. 28, 2016 (JP) .................. 2016-063379

(51) Int. Cl.
*G06N 3/08* (2006.01)
*G06T 7/55* (2017.01)
(Continued)

(52) U.S. Cl.
CPC .............. *G06N 3/08* (2013.01); *G01V 99/005* (2013.01); *G06F 17/5009* (2013.01); *G06N 3/0454* (2013.01); *G06T 3/4046* (2013.01); *G06T 7/55* (2017.01); *G06T 17/05* (2013.01); *G06F 2217/16* (2013.01); *G06T 2207/20081* (2013.01)

(58) Field of Classification Search
CPC .......... G06N 3/08; G06N 3/02; G06T 3/4046
See application file for complete search history.

(56) References Cited

U.S. PATENT DOCUMENTS 8,971,612 B2 * 3/2015 Shotton ................ G06K 9/6255
382/159
9,632,502 B1 * 4/2017 Levinson .............. G01S 7/4972
(Continued)

OTHER PUBLICATIONS

Mnih et al., Playing Atari with Deep Reinforcement Learning, NIPS Deep Learning Workshop 2013, Dec. 19, 2013, pp. 1-9.

*Primary Examiner* — Santiago Garcia
(74) *Attorney, Agent, or Firm* — Paratus Law Group, PLLC

(57) ABSTRACT

There is provided an information processing device to improve generalization performance of the neural network, the information processing device including: a control unit configured to control display related to a setting of a parameter related to physical simulation; a communication unit configured to transmit the parameter to a physical simulator and receive image information obtained in the physical simulation from the physical simulator; and a machine learning unit configured to perform machine learning on the basis of the image information. The control unit causes a display unit to display a learning result obtained by the machine learning unit and the parameter in association with each other.

19 Claims, 17 Drawing Sheets

(51) Int. Cl.
*G06T 3/40* (2006.01)
*G01V 99/00* (2009.01)
*G06F 17/50* (2006.01)
*G06T 17/05* (2011.01)
*G06N 3/04* (2006.01)

(56) References Cited

U.S. PATENT DOCUMENTS

| | | | |
|---|---|---|---|
| 2012/0194517 A1* | 8/2012 | Izadi | G06T 17/00 345/420 |
| 2013/0156297 A1* | 6/2013 | Shotton | G06K 9/6255 382/159 |
| 2015/0201895 A1* | 7/2015 | Suzuki | A61B 6/488 382/131 |
| 2017/0123419 A1* | 5/2017 | Levinson | G01S 7/4972 |
| 2017/0124476 A1* | 5/2017 | Levinson | G05D 1/0088 |
| 2017/0132334 A1* | 5/2017 | Levinson | G06F 17/5009 |
| 2017/0160363 A1* | 6/2017 | Chen | G01R 33/5608 |
| 2017/0316333 A1* | 11/2017 | Levinson | G01S 17/87 |

\* cited by examiner

FIG. 16

| # | parameter 1 | Input | Output |
|---|---|---|---|
| 1 | 35 | GI11 | 1 |
| 2 | 40 | GI12 | 1 |
| 3 | 45 | GI13 | 0 |

INFORMATION PROCESSING DEVICE

CROSS REFERENCE TO PRIOR APPLICATION

This application is a National Stage Patent Application of PCT International Patent Application No. PCT/JP2016/088889 (filed on Dec. 27, 2016) under 35 U.S.C. § 371, which claims priority to Japanese Patent Application No. 2016-063379 (filed on Mar. 28, 2016), which are all hereby incorporated by reference in their entirety.

TECHNICAL FIELD

The present disclosure relates to an information processing device.

BACKGROUND ART

In recent years, a neural network imitating a mechanism of a cranial nervous system has attracted attention. Further, techniques of causing a neural network to perform machine learning using a physical simulator have been reported. For example, Non-Patent Literature 1 describes a game control learning result using a simulator.

CITATION LIST

Non-Patent Literature

[Non-Patent Literature 1] DeepMind Technologies, 7 people, "Playing Atari with Deep Reinforcement Learning," Nov. 9, 2015 [Online], [Accessed Feb. 8, 2016], Internet <https://www.cs.toronto.edu/~vmnih/docs/dqn.pdf>

DISCLOSURE OF INVENTION

Technical Problem

However, in the method described in Non-Patent Literature 1, it is difficult to cause the neural network to perform learning according to various changes occurring in the real world.

In this regard, the present disclosure proposes an information processing device which is capable of further improving generalization performance of the neural network.

Solution to Problem

According to the present disclosure, there is provided an information processing device including: a control unit configured to control display related to a setting of a parameter related to physical simulation; and a communication unit configured to transmit image information obtained in the physical simulation the parameter associated with the image information to a machine learning unit and receive a determination result based on the image information from the machine learning unit. The control unit causes a display unit to display the determination result and the parameter in association with each other.

Further, according to the present disclosure, there is provided an information processing device including: a control unit configured to control display related to a setting of a parameter related to physical simulation; a communication unit configured to transmit the parameter to a physical simulator and receive image information obtained in the physical simulation from the physical simulator; and a machine learning unit configured to perform machine learning on the basis of the image information. The control unit causes a display unit to display a learning result obtained by the machine learning unit and the parameter in association with each other.

Advantageous Effects of Invention

As described above, according to the present disclosure, it is possible to further improve generalization performance of the neural network. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 16 is a display example of a learning result display region.

MODE(S) FOR CARRYING OUT THE INVENTION

Figure 1:
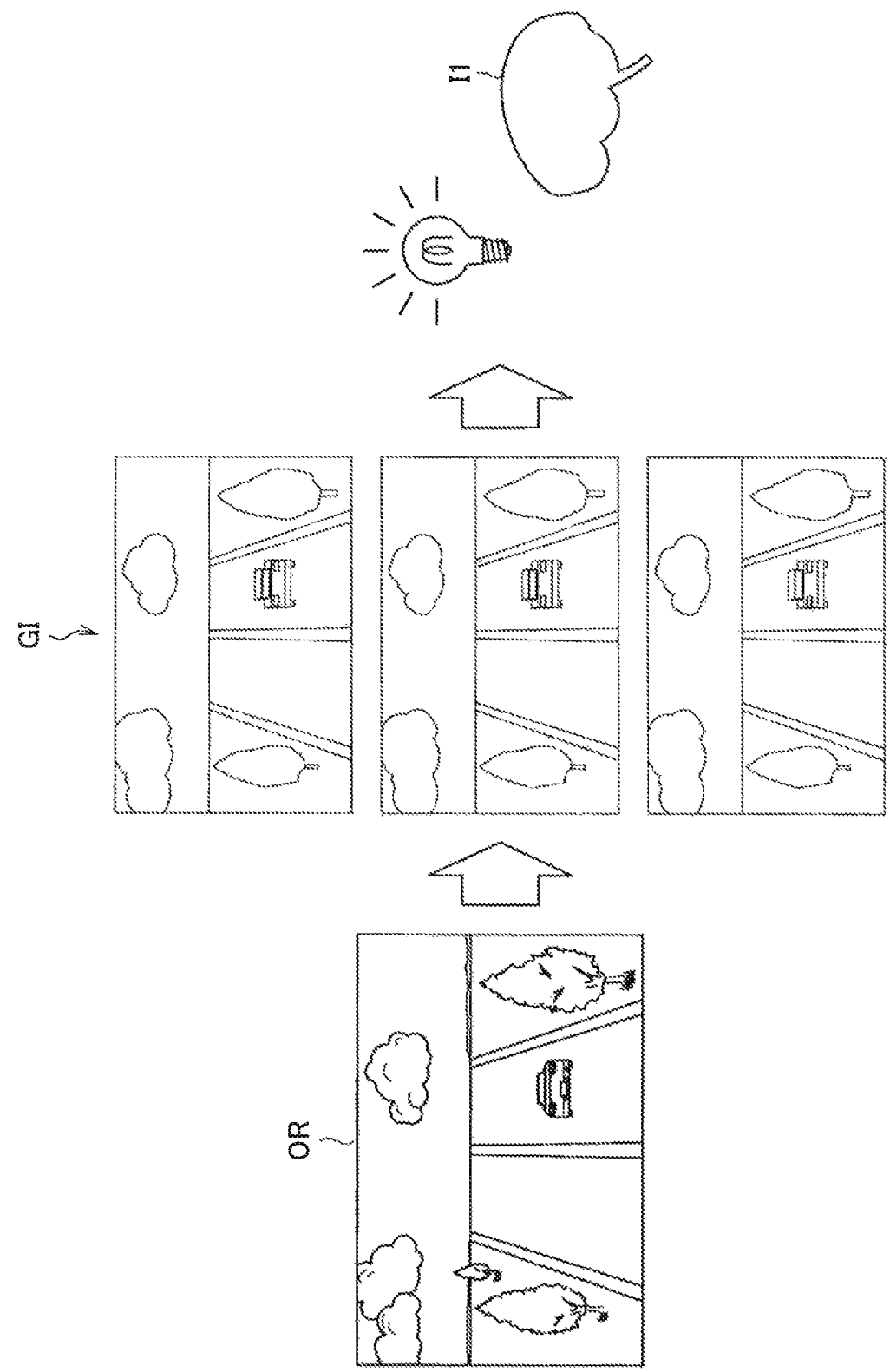
FIG. 1 is a conceptual diagram illustrating an overview of machine learning according to the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Overview of present disclosure
1.1. Neural network
1.2. Generalization performance related to neural network
1.3. Image generation related to improvement of generalization performance
1.4. Overview of information processing device according to present disclosure
2. First embodiment
2.1. System configuration example according to first embodiment
2.2. Information processing device 10 according to first embodiment
2.3. Overview of control according to first embodiment
2.4. Configuration example of user interface
2.5. Generation of three-dimensional model by SLAM
2.6. Flow of control according to first embodiment
3. Second embodiment
3.1. System configuration according to second embodiment
3.2. Machine learning device 20 according to second embodiment
3.3. Display of learning result according to second embodiment
4. Hardware configuration example
5. Conclusion 1. Overview of Present Disclosure <<1.1. Neural Network>>

A neural network refers to a model imitating a human cranial neural circuit and is technology for implementing a human learning ability on a computer. As described above, one feature of a neural network is that it has a learning ability. In a neural network, artificial neurons (nodes) forming a network by synaptic coupling are able to acquire a problem solving ability by changing a synaptic coupling strength through learning. In other words, a neural network is able to automatically infer a problem resolution rule by repeating learning.

Examples of learning performed by neural networks include image recognition and voice recognition. A neural network becomes able to recognize an object or the like included in an input image, for example, by repeatedly learning an input image pattern. The learning ability of neural networks is drawing attention as a key for driving development of artificial intelligence (AI). Further, the learning ability of neural networks is expected to be applied in various industrial fields.

<<1.2. Generalization Performance Related to Neural Network>>

Here, generalization performance related to neural networks will be described. Generalization performance related to neural networks may be understood as an ability to deal with more situations. In other words, generalization performance can be regarded as an index indicating flexibility of a neural network for input data.

Generalization performance has a very important meaning to various kinds of devices to which neural networks are applied. For example, high generalization performance is generally required for automated driving AIs that perform vehicle driving control. Here, an automated driving AI may be, for example, a learning device that has acquired a driving control function through deep learning using a neural network of a multi-layer structure.

An automated driving AI is able to perform vehicle driving control according to a surrounding environment on the basis of an environment recognition ability or a driving control ability acquired through learning. For example, an automated driving AI recognizes other vehicles or pedestrians on the basis of observation information observed from sensors, and performs steering control, brake control, or the like to avoid the vehicles or pedestrians. At this time, generalization performance of the automated driving AI is an important key.

For example, in a case in which an automated driving AI is unable to recognize other vehicles or pedestrians correctly, appropriate driving control is unable to be performed, and it is likely to cause an accident. Therefore, an AI with higher generalization performance is required in terms of safety.

<<1.3. Image Generation Relating to Improvement of Generalization Performance>>

The example of generalization performance related to neural networks has been described. Next, a technique for increasing generalization performance will be described. As described above, generalization performance can be regarded as the flexibility of a neural network for the input data. Therefore, in order to increase generalization performance, it is desirable to provide more data at the time of learning.

However, it is often the case that it requires more costs and effort to prepare data used for learning. Therefore, techniques of generating a plurality of different images from an original image and using the generated images for learning are also known.

As one such technique, for example, a technique called perturbation is known. In perturbation, it is possible to generate a plurality of different images by changing a scale, a rotation angle, luminance, and a contrast of an original image.

However, in perturbation, since many images that are not observed in a real world environment are generated, it is hard to say that machine learning using these images is efficient. For example, in perturbation, it is possible to generate different images by changing an aspect ratio of an image, but such a phenomenon is not observed in substances in the real world. For this reason, in order to improve generalization performance, a technique of generating images conforming to the real world environment is necessary.

Generally, control related to image generation and machine learning using perturbation or the like is performed through different independent user interfaces. For this reason, for example, an operation of inputting the generated images to a learning device is manually performed and requires labor. Further, in a case in which an image is generated again in accordance with an output result of the learning device, it is necessary to improve working efficiency because it goes back and forth between the different user interfaces.

An information processing device according to the present disclosure was conceived focusing on the image generation technique and the learning technique described above and implements machine learning with high efficiency by generating images conforming to the real world environment. To this end, the information processing device according to the present disclosure can generate images using a physical simulator. Further, the information processing device according to the present disclosure implements more efficient machine learning by providing information related to the physical simulation and the machine learning using a single user interface.

<<1.4. Overview of Information Processing Device According to Present Disclosure>>

The background of the present disclosure has been described above. Next, an overview of the information processing device according to the present disclosure will be described. As described above, the information processing device according to the present disclosure can perform image generation using the physical simulator. Here, the physical simulator may be a simulator equipped with a physical engine that simulates a dynamics law. The physical simulator is able to reproduce various environments observable in the real world on the basis of set parameters.

Here, the parameters may include parameters related to a viewpoint, a lighting condition, a background, a time, a weather condition, or the like. The physical simulator is able to perform various physical simulations on the basis of parameters related to, for example, movement of the sun, a strength of rain or wind, an angle of a viewpoint, or the like. In other words, the information processing device according to the present disclosure is able to obtain images closer to the real world environment by implementing the image generation using the physical simulator.

FIG. 1 is a conceptual diagram illustrating an overview of machine learning implemented by the information processing device according to the present disclosure. Referring to FIG. 1, the information processing device according to the present embodiment is able to obtain a plurality of generated images GI from an original image OR serving as a source. Here, the original image OR may be a two-dimensional image obtained by various methods. The information processing device according to the present disclosure is able to acquire a plurality of generated images GI by performing physical simulation using a three-dimensional model generated from the original image OR.

Further, the information processing device according to the present disclosure is able to cause a learning device I1 to learn a plurality of generated images GI and acquire a learning result. At this time, the information processing device according to the present disclosure is able to control a process related to the image generation and the learning through a single user interface.

Figure 2:
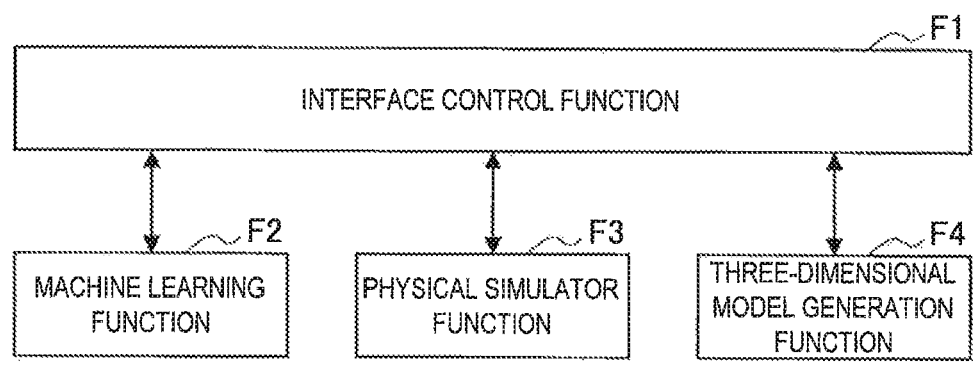
FIG. 2 is a conceptual diagram illustrating a functional configuration of an information processing device according to the present disclosure.

FIG. 2 is a conceptual diagram illustrating a functional configuration of the information processing device according to the present disclosure. Referring to FIG. 2, the information processing device according to the present disclosure includes an interface control function F1, a machine learning function F2, a physical simulator function F3, and a three-dimensional model generation function F4.

Here, the interface control function F1 may be a function of controlling the user interface provided by the information processing device. Specifically, the interface control function F1 is able to provide the user with the user interface for controlling an input and an output among the machine learning function F2, the physical simulator function F3, and the three-dimensional model generation function F4.

Further, the machine learning function F2 may be a function of performing the machine learning on input information. For example, the machine learning function F2 may identify image information input from the interface control function F1 and return an identification result to the interface control function F1.

Further, the physical simulator function F3 may be a function of executing the physical simulation on the basis of the input information. For example, the physical simulator function F3 may execute the physical simulation on the basis of a three-dimensional model and a parameter input from the interface control function F1 and return image information related to the physical simulation to the interface control function F1.

Further, the three-dimensional model generation function F4 may be a function of generating a three-dimensional model from an input two-dimensional image. For example, the three-dimensional model generation function F4 may generate a three-dimensional model from a two-dimensional image input from the interface control function F1 and return information related to the three-dimensional model to the interface control function F1.

The overview of the functional configuration of the information processing device according to the present disclosure has been described above. The information processing device according to the present disclosure may be a device having the functions listed above. At this time, the functional configuration of the information processing device may be appropriately designed depending on operating conditions or the like. For example, the information processing device according to the present disclosure may include an interface control function F1 and the physical simulator function F3. In this case, the above information processing device is able to improve the generalization performance related to the machine learning by performing communication with another device having the machine learning function F2 or the three-dimensional model generation function F4.

2. First Embodiment

<<2.1. System Configuration Example Related to First Embodiment>>

Figure 3:
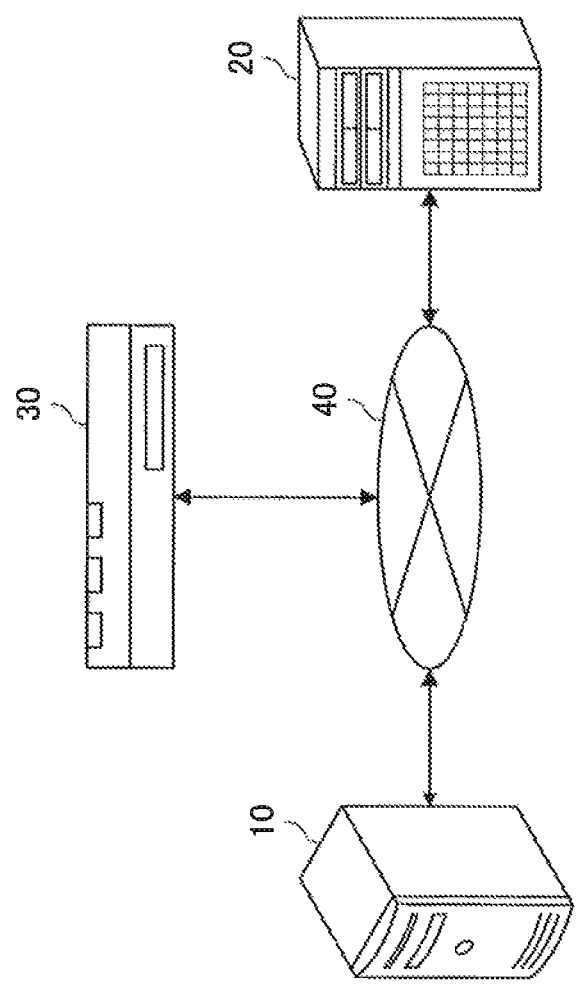
FIG. 3 is a system configuration example according to a first embodiment of the present disclosure.

Next, a system configuration example according to a first embodiment will be described. Referring to FIG. 3, a system according to the first embodiment includes an information processing device 10, a machine learning device 20, and a model generating device 30. Further, the information processing device 10, the machine learning device 20, and the model generating device 30 are connected via a network 40 so that they are able to perform communication with each other.

Here, the information processing device 10 according to the first embodiment may be a device having the interface control function F1 and the physical simulator function F3. In other words, the information processing device 10 according to the present embodiment may be a physical simulator having a function of providing the user interface for performing image generation and learning control related to the machine learning.

The machine learning device 20 may be a device that performs the machine learning on the basis of information received from the information processing device 10. Specifically, the machine learning device 20 is able to perform identification learning related to image information on the basis of image information received from the information processing device 10. The machine learning device 20 also has a function of transmitting an identification result for the image information received from the information processing device 10 to the information processing device 10.

For example, the machine learning device 20 may perform learning based on deep learning or learning based on reinforcement learning. For example, the machine learning device 20 is able to perform learning in which deep learning and Q learning are combined.

The model generating device 30 may have a function for generating a three-dimensional model on the basis of two-dimensional image information received from the information processing device 10. At this time, for example, the model generating device 30 is able to perform three-dimensional model generation using a technique such as simultaneous localization and mapping (SLAM). The model generating device 30 may generate the three-dimensional model through a technique other than SLAM. In this case, the model generating device 30 may generate the three-dimensional model using a widely used three-dimensional modeling technique. The model generating device 30 also has a function of transmitting information of the generated three-dimensional model to the information processing device 10.

The network 40 has a function of connecting the information processing device 10, the machine learning device 20, and the model generating device 30 with one another. The network 40 may include a public line network such as the Internet, a telephone line network, a satellite communication network, or the like, various types of local area networks (LANs) including Ethernet (a registered trademark), a wide area network (WAN), or the like. Further, the network 40 may include a dedicated line network such as Internet protocol-virtual private network (IP-VPN).

<<2.2. Information Processing Device 10 According to First Embodiment>>

Next, the information processing device 10 according to the present embodiment will be described in detail. As described above, the information processing device 10 according to the present embodiment may be a device including the interface control function F1 and a physical simulation function F3. In other words, the information processing device 10 according to the present embodiment has a function of controlling an input and an output between the machine learning device 20 and the model generating device 30 and providing the user interface for performing the image generation and the learning control related to the machine learning. Further, the information processing device 10 according to the present embodiment has a physical simulation function of generating an image related to the machine learning.

Figure 4:
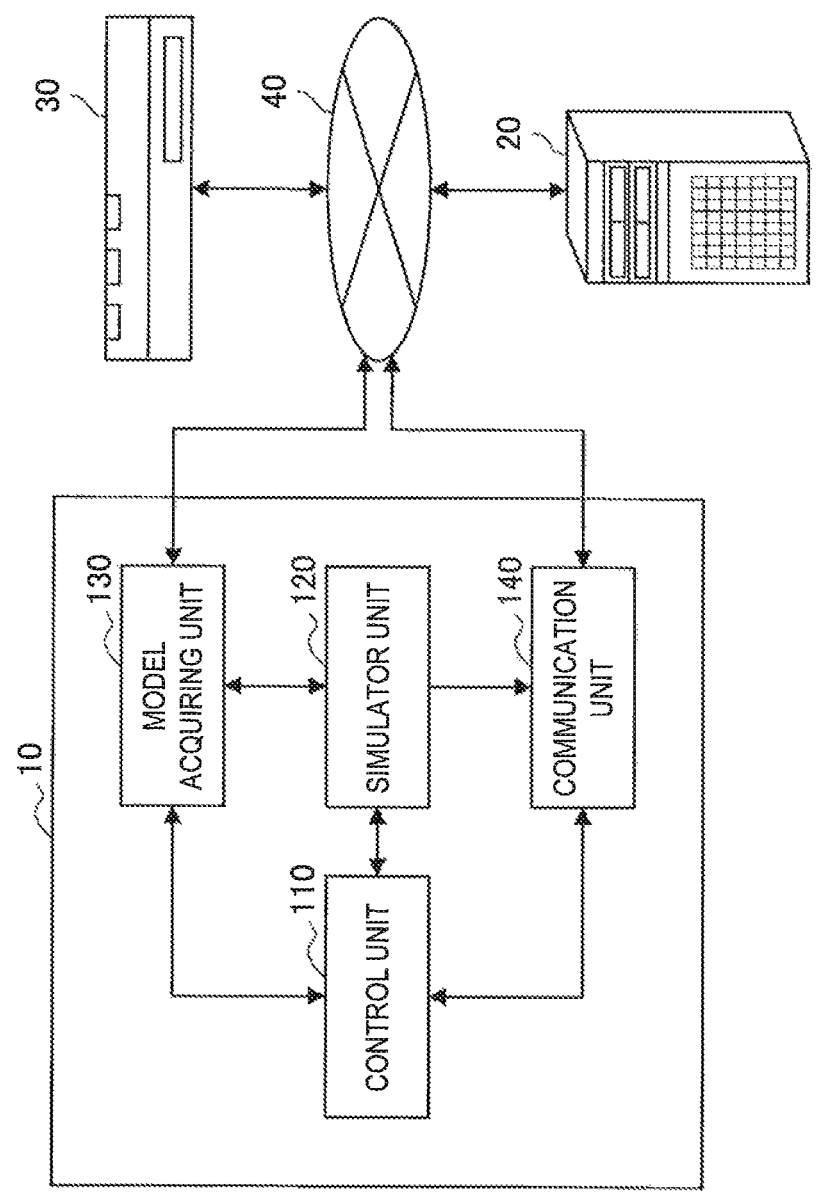
FIG. 4 is a functional block diagram of an information processing device according to the embodiment.

FIG. 4 is a functional block diagram of the information processing device 10 according to the present embodiment. Referring to FIG. 4, the information processing device 10 according to the present embodiment includes a control unit 110, a simulator unit 120, a model acquiring unit 130, and a communication unit 140.

(Control Unit 110)

The control unit 110 has a function of controlling display related to a parameter setting related to the physical simulation. Further, the control unit 110 has a function of associating a determination result acquired from the machine learning device 20 with the parameter and displaying it on a connected display unit (not illustrated). Here, the determination result may be an identification result for input image information.

Further, the control unit 110 may have a function of dynamically setting the above parameter. Specifically, the control unit 110 is able to set a parameter range designating a range of a parameter value, division information related to the parameter range, and the like. The parameter setting function of the control unit 110 will be described later in detail.

Further, the control unit 110 may have a function of recognizing an operation of the user and performing a process in accordance with the user operation. For example, the user operation may include operations related to parameter setting and change, selection of an original image, start and stop of learning, and the like. The control unit 110 may acquire information related to the user operation from a connected input device (not illustrated) and perform a process according to the user operation.

(Simulator Unit 120)

The simulator unit 120 has a function of performing the physical simulation based on the dynamics law. Specifically, the simulator unit 120 is able to execute the physical simulation on the basis of the parameter set by the control unit 110 and the three-dimensional model acquired by the model acquiring unit 130 to be described later.

Further, the simulator unit 120 has a function of acquiring a two-dimensional image from a three-dimensional image related to the physical simulation. At this time, the simulator unit 120 may acquire the two-dimensional image on the basis of the parameter set by the control unit 110. Here, the two-dimensional image may be a two-dimensional CG image. A two-dimensional image acquisition function of the simulator unit 120 will be described later in detail.

(Model Acquiring Unit 130)

The model acquiring unit 130 has a function of acquiring the three-dimensional model generated from the two-dimensional image. In other words, the model acquiring unit 130 may have a function of causing the model generating device 30 to generate the three-dimensional model on the basis of the information of the original image transferred from the control unit 110 and acquiring the generated three-dimensional model. Particularly, in a case in which the model generating device 30 generates the three-dimensional model through SLAM, the model acquiring unit 130 is able to acquire the three-dimensional model generated through SLAM.

Further, the model acquiring unit 130 is able to transfer the acquired three-dimensional model to the simulator unit 120. The model acquiring unit 130 may acquire the three-dimensional model directly from the model generating device 30 or may acquire the three-dimensional model via the communication unit 140 to be described later.

(Communication Unit 140)

The communication unit 140 has a function of performing communication between the machine learning device 20 and the model generating device 30. For example, the communication unit 140 is able to transmit the image information associated with the parameter obtained in the physical simulation to the machine learning device 20. Further, the communication unit 140 is able to receive a determination result based on the image information from the machine learning device 20.

Further, the communication unit 140 may receive a plurality of determination results executed by a plurality of different neural works having different network structures from the machine learning device 20. In this case, the control unit 110 is able to cause a plurality of determination results to be displayed on the display unit in association with the parameter.

Further, the communication unit 140 may further transmit a compensation related to the image information to the machine learning device 20. In this case, the machine learning device 20 is able to perform reinforcement learning using the received compensation.

<<2.3. Overview of Control Related to Present Embodiment>>

Next, an overview of control according to the present embodiment will be described. As described above, the information processing device 10 according to the present embodiment has a function of providing the user interface for performing the image generation and the learning control related to the machine learning. The user is able to cause the machine learning device 20 to execute the image generation related to the machine learning or the machine learning using an image by operating the user interface. Further, since the user is able to check the determination result obtained by the machine learning device 20 with the same user interface, it is possible to perform work efficiently.

Further, the information processing device 10 according to the present embodiment is able to dynamically set the parameters related to the physical simulation. For example, the information processing device 10 may first perform the physical simulation with a wide parameter interval and cause the machine learning device 20 to identify the obtained generated image. At this time, by receiving the identification result from the machine learning device 20, the information processing device 10 is able to estimate the parameter range which is difficult for the machine learning device 20 to identify.

In this case, around a parameter value associated with an erroneously determined image, the information processing device 10 may perform the physical simulation at finer parameter intervals and perform additional image generation. In other words, the information processing device 10 is able to set a new parameter on the basis of an identification result and search for a boundary of a parameter value which is difficult for the machine learning device 20 to identify in further detail.

Further, the information processing device 10 is able to generate a large number of images used for learning related to the parameter range which is difficult for the machine learning device 20 to identify by performing the image generation around the parameter value associated with the erroneously determined image. In other words, in accordance with the information processing device 10 of the present embodiment, it is possible to implement effective learning according to a current identification ability of the machine learning device 20.

<<2.4. Configuration Example of User Interface>>

Figure 5:
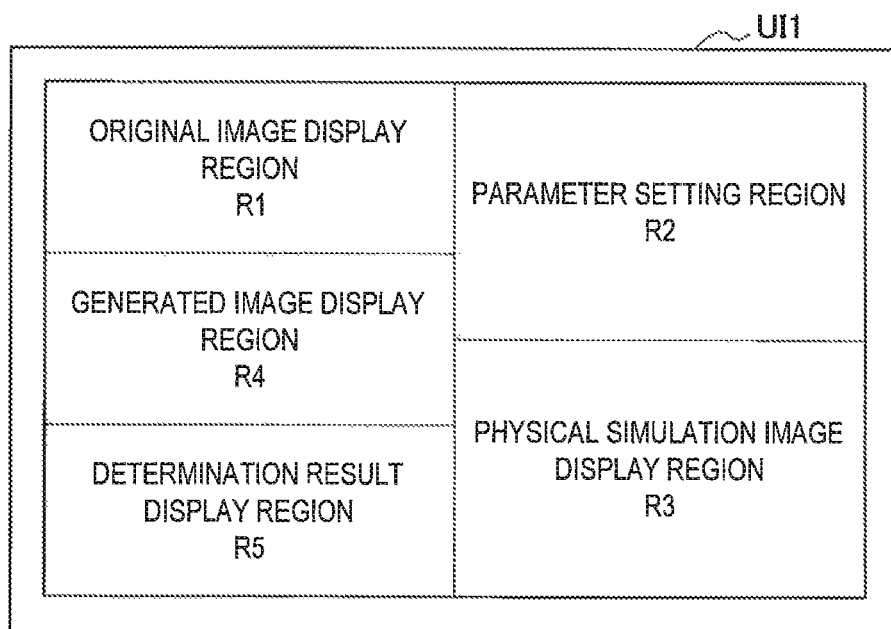
FIG. 5 is a configuration example of a user interface according to the embodiment.

The overview of the control according to the present embodiment has been described above. Next, a function of the information processing device 10 according to the present embodiment will be described in further detail while describing a configuration of the user interface according to the present embodiment. FIG. 5 is a configuration example of the user interface according to the present embodiment.

Referring to FIG. 5, a user interface UI1 according to the present embodiment includes an original image display region R1, a parameter setting region R2, a physical simulation image display region R3, a generated image display region R4, and a determination result display region R5. Content displayed on each of the regions R1 to R5 will be described below in detail with reference to FIGS. 6 to 12.

(Original Image Display Region R1)

The original image display region R1 is a region in which the user selects an original image. In other words, the original image display region R1 may be a region for designating a two-dimensional image (original image) serving as the origin of the three-dimensional model to be generated by the model generating device 30.

Figure 6:
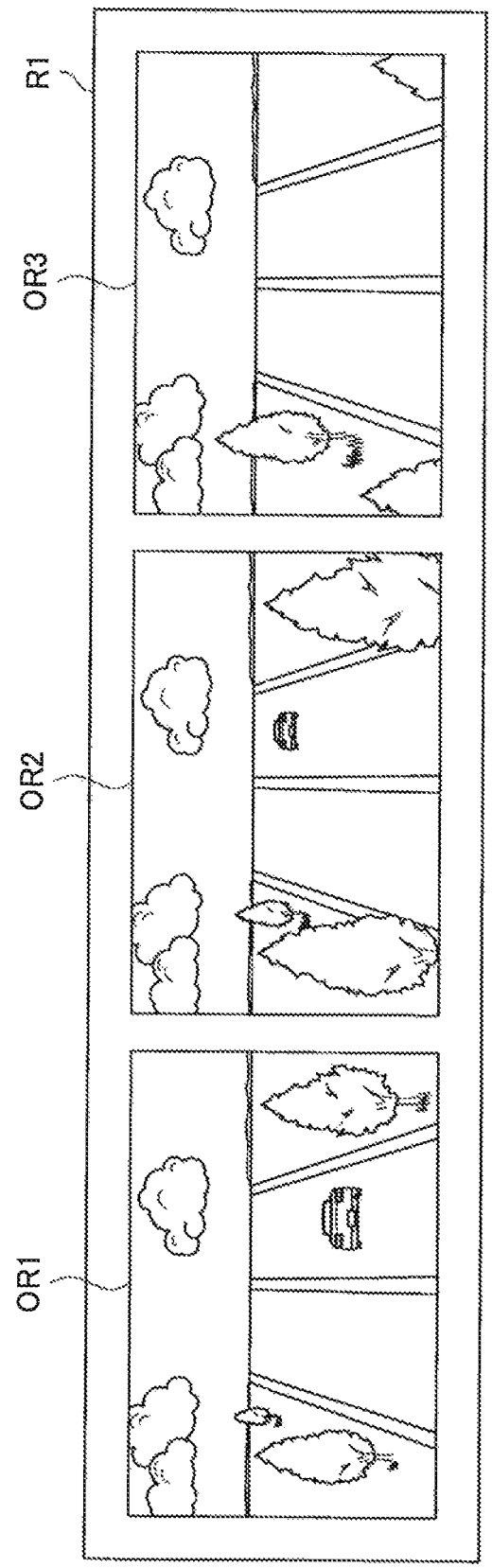
FIG. 6 is a display example of an original image display region according to the embodiment.

FIG. 6 illustrates a display example of the original image display region R1. Referring to FIG. 6, a plurality of original images OR1 to OR3 are displayed on the original image display region R1 according to the present embodiment. The user is able to designate a two-dimensional image to be used for three-dimensional modeling by selecting an arbitrary original image on the original image display region R1.

The two-dimensional image displayed on the original image display region R1 may be a two-dimensional image previously captured by the user or may be a two-dimensional image collected from various kinds of devices connected via the network 40 by the information processing device 10. For example, the information processing device 10 may collect image information photographed by an in-vehicle device mounted on a vehicle and cause the image information to be displayed on the original image display region R1.

Further, the user may be able to designate a plurality of original images on the original image display region R1. In a case in which the model generating device 30 generates the three-dimensional model using a technique such as the SLAM, a plurality of original images are obtained. For this reason, the user may designate the original image in accordance with a three-dimensional modeling technique of the model generating device 30.

Although not illustrated, various kinds of messages may be displayed on the original image display region R1 in accordance with the three-dimensional modeling technique of the model generating device 30. The message may be, for example, content such as "Please designate a plurality of images which are consecutively captured." The user is able to designate an appropriate original image in accordance with the message.

(Parameter Setting Region R2)

Parameter setting region R2 is a region for setting various kinds of parameters related to the physical simulation. The parameter setting region R2 may be provided with a means for designating, for example, a parameter range or division information related to the parameter range.

Figure 7:
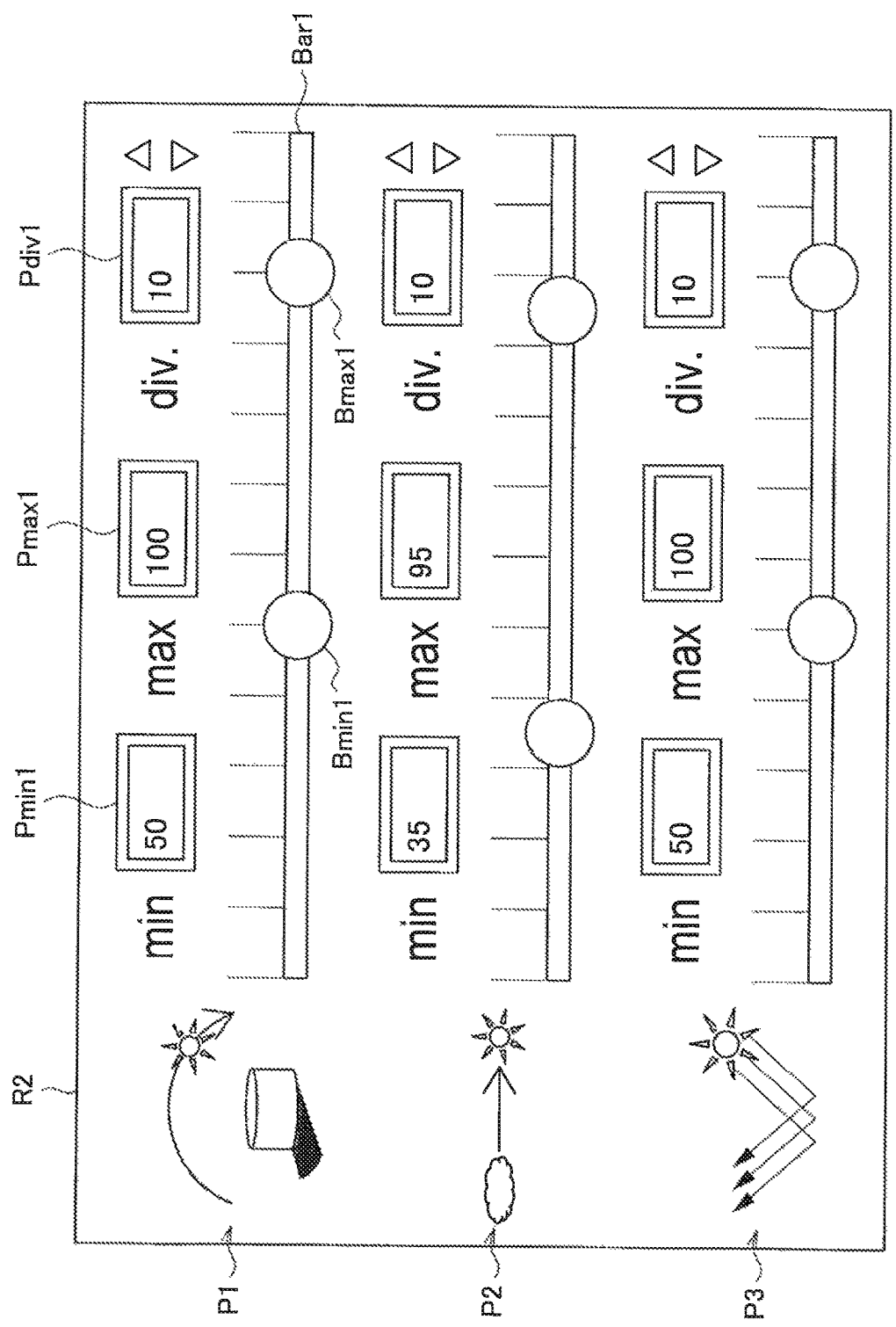
FIG. 7 is a display example of a parameter setting region according to the embodiment.

FIG. 7 illustrates a display example of the parameter setting region R2 according to the present embodiment. Referring to FIG. 7, setting items related to a plurality of parameters P1 to P3 are displayed on the parameter setting region R2. In one example illustrated in FIG. 7, the parameter P1 may be a parameter related to a sun position. Further, the parameter P2 may be a parameter related to an amount of cloud. The parameter P3 may be a parameter related to reflectance of sunlight on a road surface.

In the example illustrated in FIG. 7, setting items related to the three parameters P1 to P3 are illustrated, but setting items related to tour or more parameters may be displayed on the parameter setting region R2. Further, the user may be able to switch the parameters to be displayed through a button operation or the like.

Further, setting items related to the parameters P1 to P3 are displayed on the parameter setting region R2. Here, the setting item may include a parameter range. Referring to FIG. 7, an item Pmin1 for setting a minimum value related to the parameter P1 and an item Pmax1 for setting a maximum value related to the parameter P1 are displayed on the parameter setting region R2.

At this time, the control unit 110 is able to cause the parameter range to be displayed using an indicator related to the value of the parameter. In the example illustrated in FIG. 7, the parameter value related to the parameter P1 is visually indicated by a Bar1, and a button Bmin1 corresponding to the item Pmin1 and a button Bmax1 corresponding to the item Pmax1 are displayed on the Bar1. The user is able to change the parameter range related to the parameter P1 by operating the buttons Bmin1 and Bmax1.

Further, the setting item may include division information related to the parameter range. Here, the division information may be the number of divisions for dividing the parameter range. In the example illustrated in FIG. 7, an item Pdiv1 for designating the number of divisions related to the parameter P1 is displayed. The simulator unit 120 according to the present embodiment is able to obtain a plurality of generated images on the basis of the parameter range and the number of divisions.

Further, the control unit 110 is able to automatically set a parameter related to an initial physical simulation (hereinafter also referred to as an "initial parameter"). As described above, the control unit 110 according to the present embodiment is able to set a new parameter on the basis of an identification result of the machine learning device 20. At this time, the control unit 110 may first set a wide parameter range as the initial parameter and acquire an identification result from the machine learning device 20. Subsequently, the control unit 110 may set a parameter range narrower than the initial parameter on the basis of the identification result and cause the image generation to be performed. Accordingly, it is possible to obtain a generated image of a parameter value which is difficult for the machine learning device 20 to recognize.

The control unit 110 is able to automatically set the initial parameter on the basis of, for example, a default value decided for each parameter, a result of learning executed in the past, or the like. Further, an automatic setting of the initial parameter performed by the control unit 110 may be designed so that it is switched. whether or not execution is necessary in accordance with the user setting. The user may be able to set the initial parameter. In a case in which the control unit 110 automatically sets the initial parameter, the user may be able to change each setting value. Accordingly, it is possible to perform a more flexible parameter setting according to the user's determination.

(Physical Simulation Image Display Region R3)

The physical simulation image display region R3 is a region for displaying the state of the physical simulation performed by the simulator unit 120. In other words, a process of the physical simulation based on the three-dimensional model generated from the original image and the set parameters may be displayed in real time on the physical simulation image display region R3.

Figure 8:
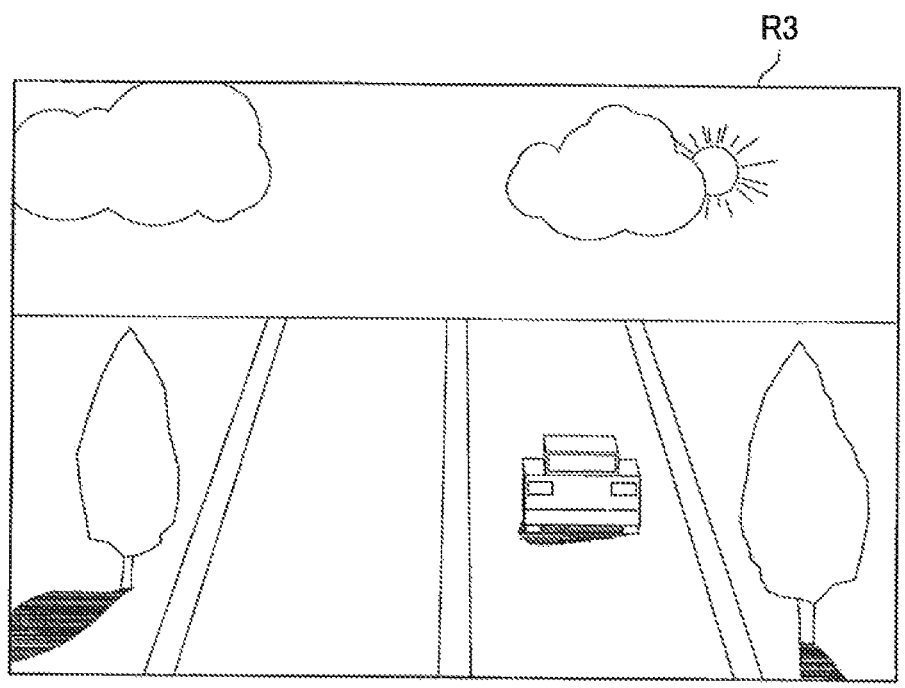
FIG. 8 is a display example of a physical simulation image display region according to the embodiment.

FIG. 8 is a display example of the physical simulation image display region R3 according to the present embodiment. As described above, the simulator unit 120 is able to execute the physical simulation based on the three-dimensional model generated from the original image and the set parameter. At this time, the three-dimensional model may be a three-dimensional model generated by the model generating device 30 on the basis of the two-dimensional image specified on the original image display region R1. Further, the parameter may be a parameter set on the parameter setting region R2 by the control unit 110 or the user.

Further, the simulator unit 120 is able to generate the two-dimensional CG image on the basis of the set parameter in the physical simulation. More specifically, the simulator unit 120 may generate the two-dimensional CG image on the basis of the parameter range and the number of divisions set on the parameter setting region R2. For example, in a case in which numbers 1 to 100 are set as the parameter range, and the number of divisions is set to 10, the simulator unit 120 may generate two-dimensional CG images which are equal in number to a multiple of 10 of the parameter value.

(Generated Image Display Region R4)

The generated image display region R4 is a region for displaying the generated image obtained in the physical simulation by the simulator unit 120. As described above, the generated image may be a two-dimensional CG image obtained on the basis of the parameter setting.

Figure 9:
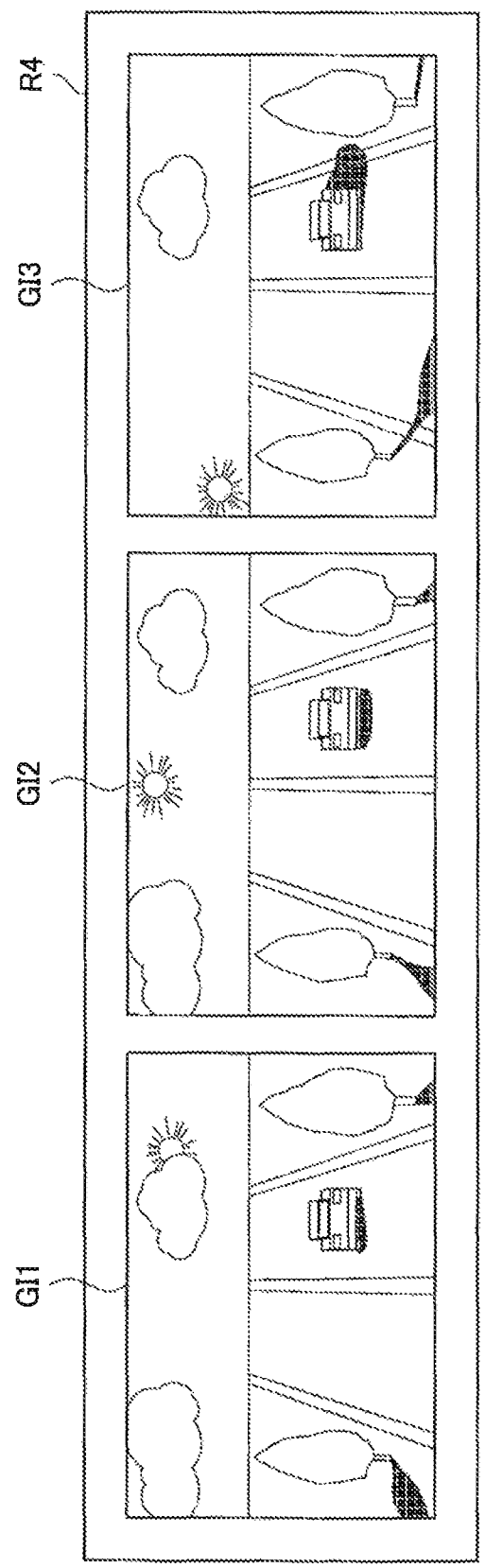
FIG. 9 is a display example of a generated image display region according to the embodiment.

FIG. 9 is a display example of the generated image display region R4 according to the present embodiment. Referring to FIG. 9, generated images GI1 to GI3 obtained by the physical simulation are displayed on the generated image display region R4. The generated image display region R4 may be updated in real time in accordance with an execution state of the physical simulation. In other words, generated images obtained by the execution process of the physical simulation may be sequentially added on the generated image display region R4.

In the example illustrated in FIG. 9, the generated images GI1 to GI3 may be images obtained from the physical simulation executed on the basis of the setting of the parameter P1 illustrated in FIG. 7. Referring to FIG. 9, it is understood that the positions of the sun are different in the generated images GI1 to GI3. As described above, according to the information processing device 10 of the present embodiment, it is possible to efficiently generate images conforming to environmental changes in the real world and provide the generated images to the machine learning device 20.

(Determination Result Display Region R5)

The determination result display region R5 is a region for displaying the determination result of the machine learning device 20 for the generated image. In other words, an identification result indicating whether or not the machine learning device 20 is able to identify the generated image may be displayed on the determination result display region R5.

Figure 10:
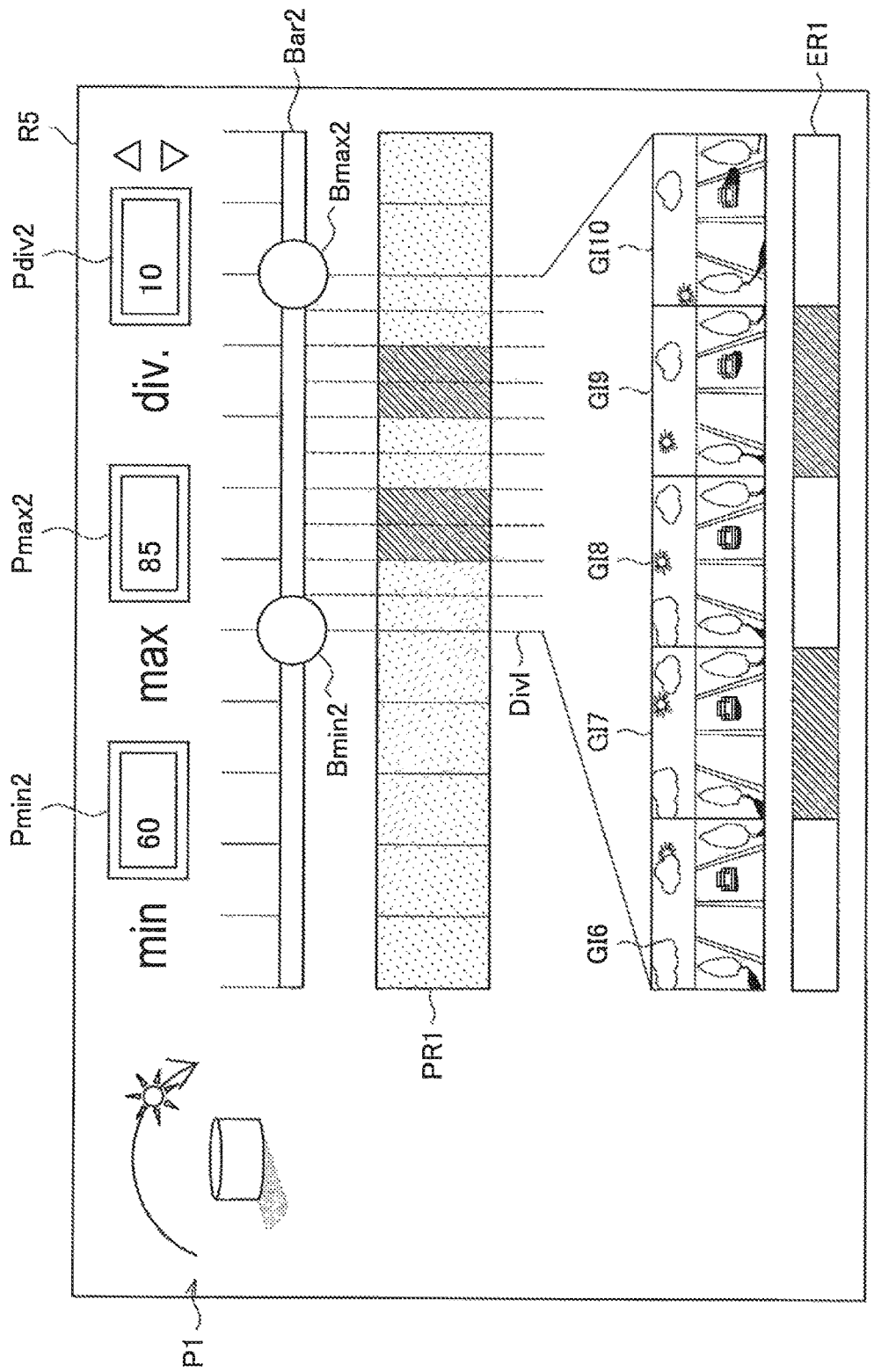
FIG. 10 is a display example of a determination result display region according to the embodiment.

FIG. 10 is a display example of the determination result display region R5 according to the present embodiment. Referring to FIG. 10, the identification result obtained by the machine learning device 20 is displayed on the determination result display region R5 in association with the parameter value. As described above, the control unit 110 according to the present embodiment is able to cause the display unit to display the identification result for the generated image and the parameter value related to the generated image in association with each other. More specifically, the control unit 110 may cause the parameter range and the number of divisions set as the initial parameter to be displayed in association with the determination result.

Referring to FIG. 10, a Bar2 indicating the parameter value visually and an identification result RR1 are displayed on the determination result display region R5. Here, the identification result RR1 includes the identification result for each generated image obtained on the basis of the parameter range and the number of divisions set as the initial parameter. In other words, in the identification result RR1, regions indicated by frame borders may be identification results of the generated images.

In the example illustrated in FIG. 10, a region related to a generated image indicating an erroneous determination made by the machine learning device 20 is indicated by hatching. As described above, since the control unit 110 displays the identification result of the generated image and the parameter related to the generated image to be visually associated with each other, the user is able to understand the parameter range which is difficult for the machine learning device 20 to identify. FIG. 10 illustrates an example of emphasizing a display related to an erroneous determination using hatching, but the identification result may be indicated using a different color such as red or blue. Further, the identification result may be indicated by a number or a character. For example, the control unit 110 may display the identification result using text information such as "true" and "false" or "1" and "0."

Further, as described above, the control unit 110 according to the present embodiment is able to set a new parameter on the basis of the identification result. At this time, the control unit 110 may cause the identification result and the new parameter to be displayed on the determination result display region R5 in association with each other.

Referring to FIG. 10, in the determination result display region R5, an item Pmin2, an item Pmax2, and an item Pdiv2 are illustrated as new parameters set by the control unit 110. Further, a button Bmin2 corresponding to the item Pmin2 and a button Bmax2 corresponding to the item Pmax2 are illustrated on the Bar2. Here, the items mentioned above may undertake the same functions as the parameter items described above with reference to FIG. 7. Referring to FIG. 10, a division line DivL is displayed on the determination result display region R5 on the basis of a value set to the item Pdiv2. Similarly to the initial parameter, the parameters listed above may be changed by the user.

As illustrated in FIG. 10, the control unit 110 may set a new parameter range on the basis of the identification result indicating the erroneous determination. At this time, the control unit 110 is able to set a new parameter range to include a parameter value associated with the identification result indicating the erroneous determination. In this case, the control unit 110 may set a new parameter range narrower than the parameter range associated with the identification result RR1. In other words, the control unit 110 according to the present embodiment is able to set a new parameter range around the parameter value associated with the erroneous determination result and searches for the boundary of the parameter value which is difficult for the machine learning device 20 to identify in further detail.

Further, the control unit 110 is able to generate a large number of image for learning related to the parameter range which is difficult for the machine learning device 20 to identify by setting a new parameter range and performing the image generation as described above. At this time, the control unit 110 is able to also adjust the number of obtained generated images by setting the number of divisions to be increased.

Further, the control unit 110 may control a display such that an identification result related to a set new parameter range or an identification result indicating an erroneous determination is enlarged. In the example illustrated in FIG. 10, an identification result related to a new parameter range including an identification result indicating an erroneous determination is highlighted as an enlargement result ER1.

Further, as illustrated in FIG. 10, the control unit 110 is able to cause the determination result and the generated image to be displayed in association with each other. In the example illustrated in FIG. 10, the control unit 110 controls the display of generated images GI6 to GI10 associated with the enlargement result ER1. The control unit 110 may control the display of the generated image associated with the identification result RR1. Further, the display of the generated image may be set to be switched by the user operation. The enlargement display control for the identification result or the display control for the generated image performed by the control unit 110 may be appropriately designed.

The display example in the case in which the control unit 110 sets a new parameter range on the basis of the identification result indicating the erroneous determination has been described above. On the other hand, the control unit 110 according to the present embodiment may set a new parameter range that does not include the parameter range associated with the identification result. In other words, the control unit 110 is able to newly set a parameter range which is not used for identification and investigate the identification ability of the machine learning device 20 in a wider range.

Figure 11:
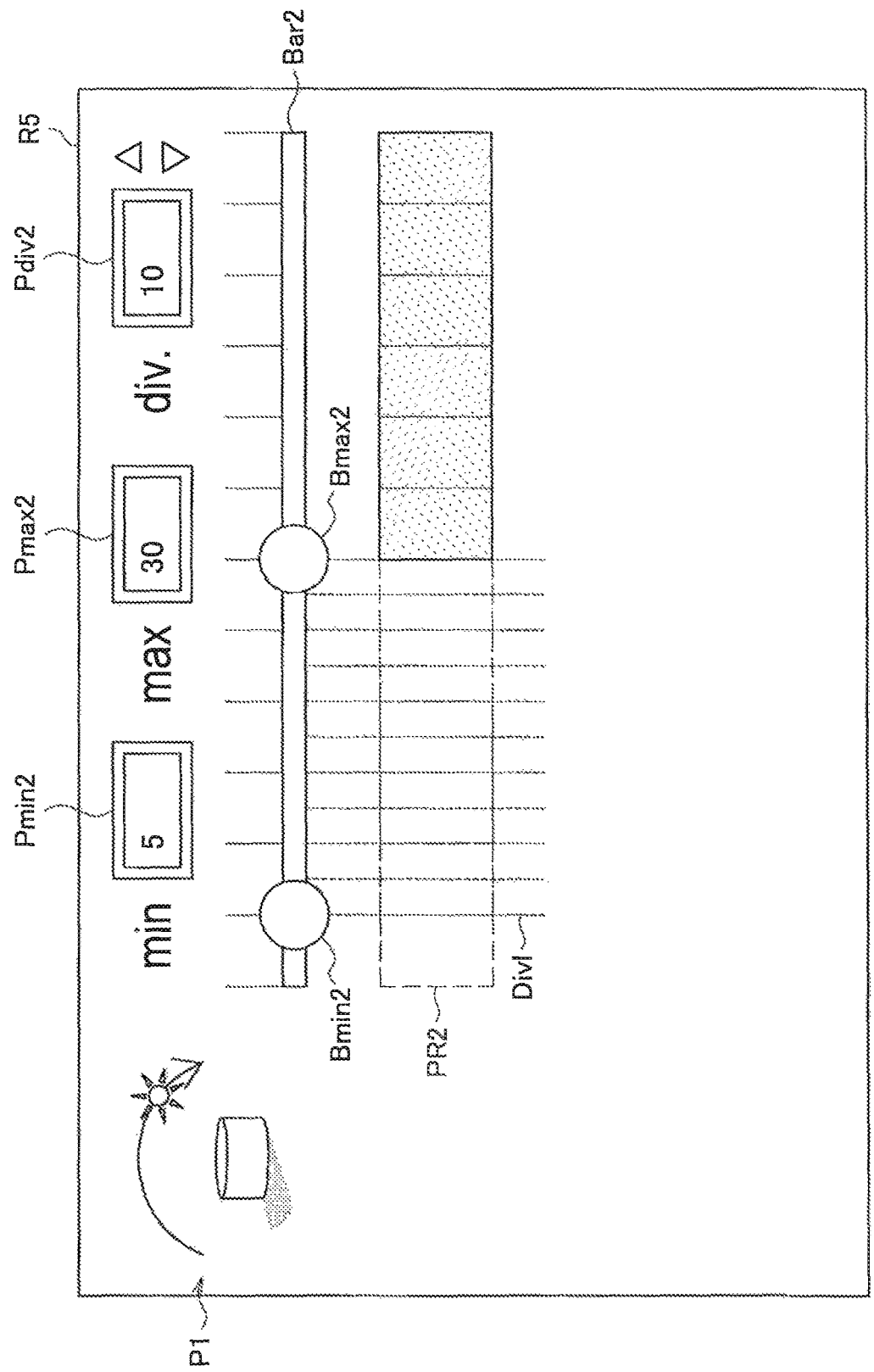
FIG. 11 is a setting example of a new parameter according to the embodiment.

FIG. 11 is a display example in a case in which the control unit 110 sets a new parameter range that does not include the parameter range associated with the identification result. Referring to FIG. 11, it is understood that the control unit 110 sets a new parameter range that does not include the parameter range associated with an identification result RR2.

Further, referring to FIG. 11, the identification result RR2 does not include the identification result indicating the erroneous determination. As described above, the control unit 110 according to the present embodiment may newly set a parameter range which is not yet used for identification on the basis of the fact that the identification result indicating the erroneous determination is not included in the identification result RR2. Accordingly, it is possible to investigate the identification ability of the machine learning device 20 more efficiently.

Figure 12:
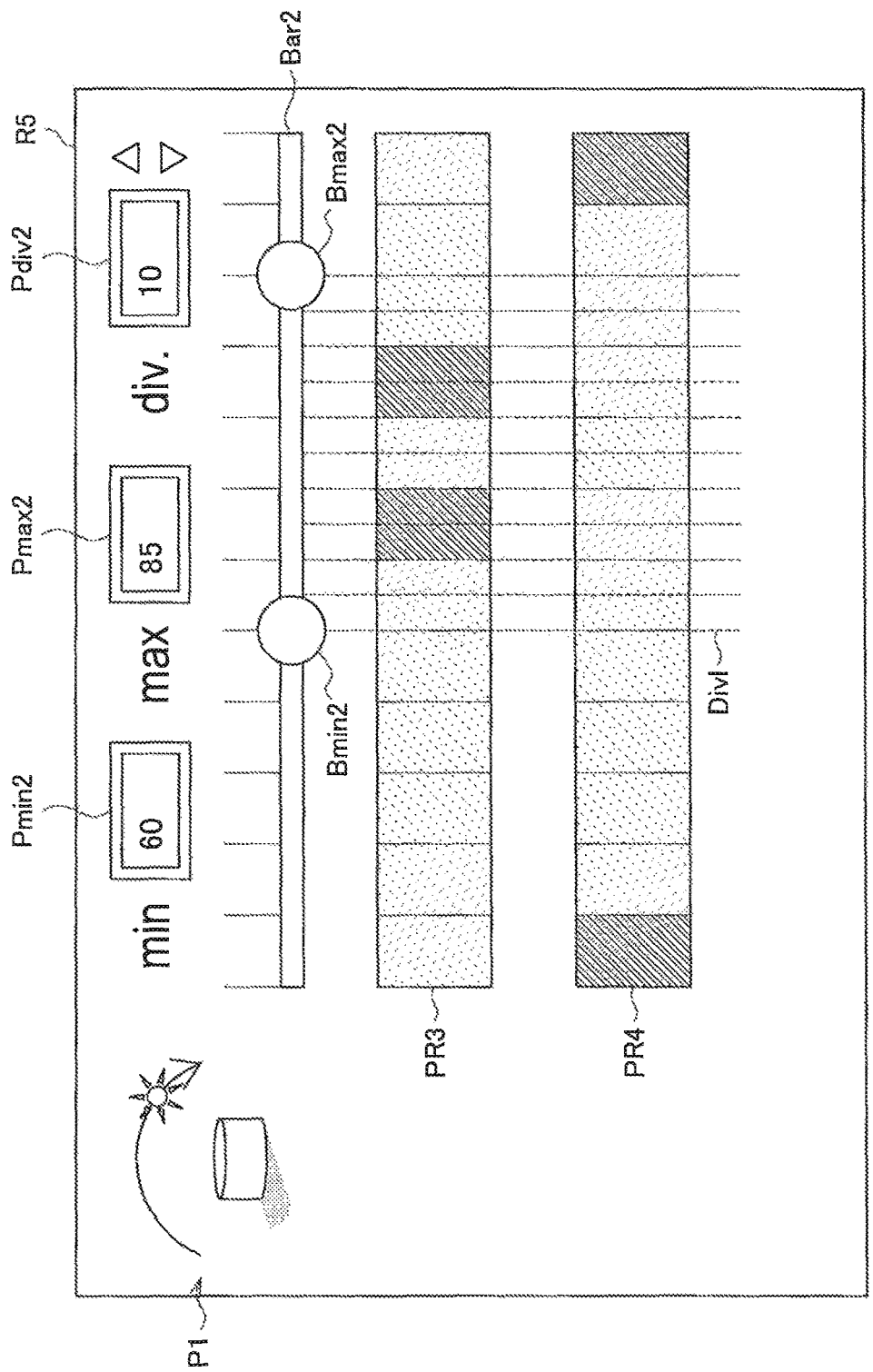
FIG. 12 is a display example of a plurality of recognition results according to the embodiment.

Further, the control unit 110 according to the present embodiment is able to compare and display a plurality of determination results determined by a plurality of neural networks having different network structures. FIG. 12 is a display example in a case in which the control unit 110 compare and display a plurality of determination results.

Referring to FIG. 12, it is understood that a plurality of identification results RR3 and RR4 are displayed on the determination result display region R5 unlike the examples illustrated in FIGS. 10 and 11. Here, the identification results RR3 and RR4 may indicate identification results obtained by different neural networks. As described above, the control unit 110 according to the present embodiment is able to compare and display the identification results obtained by a plurality of neural networks.

At this time, the communication unit 140 may acquire a plurality of identification results from a single machine learning device 20 or may acquire a plurality of identification results from a plurality of machine learning devices 20. The user is able to check a plurality of identification results displayed on the determination result region R5, determine a difference in the identification ability between a plurality of neural networks, and variously deal with it.

At this time, the control unit 110 may individually set a new parameter on the basis of each identification result or may statistically process a plurality of identification results and newly set a common parameter. The communication unit 140 is able to transmit the generated image obtained on the basis of the set new parameter to one or more machine learning devices 20.

The configuration of the user interface according to the present embodiment has been described above in detail. As described above, the information processing device 10 according to the present embodiment is able to cause the model generating device 30 to generate the three-dimensional model on the basis of the designated original image. Further, the information processing device 10 is able to execute the physical simulation on the basis of the above-described parameter and a set parameter and obtain a plurality of generated images. Further, the information processing device 10 is able to transmit a plurality of obtained generated images to the machine learning device 20 and cause the received identification result to be displayed.

According to the information processing device 10 of the present embodiment, it is possible to control the above-described process through the same user interface and improve the work efficiency remarkably. Further, the information processing device 10 according to the present embodiment is able to set a new parameter on the basis of the acquired identification result. In other words, according to the information processing device 10 of the present embodiment, it is possible to automatically generate an image related to a parameter value which is difficult to identify and cause the machine learning device 20 to learn the generated image.

The above description has been made focusing on a single parameter, but the information processing device 10 according to the present embodiment may set a new parameter focusing on a plurality of parameters. Since a closely associated parameter is included as the parameter related to the physical simulation, the information processing device 10 is able to perform a new setting related to the closely associated parameter and cause the machine learning device 20 to perform various learning. The closely associated parameter may be, for example, reflectance on a road surface, a strength of rain or sunlight, or the like.

Further, the information processing device 10 is able to simultaneously perform set a plurality of parameters and simultaneously generate a training image and a validation image. In this case, the information processing device 10 may appropriately adjust a value of a parameter different from a parameter used for generation of the training image and generate the validation image. The function as described above may be appropriately changed in accordance with a user setting.

<<2.5. Generation of Three-Dimensional Model by SLAM>>

Next, generation of the three-dimensional model by the SLAM according to the present embodiment will be described. As described above, the information processing device 10 according to the present embodiment may perform the physical simulation using the three-dimensional model generated by the SLAM. At this time, the information processing device 10 according to the present embodiment is able to transmit a plurality of consecutively captured two-dimensional images to the model generating device 30 and acquire the three-dimensional model related to a plurality of two-dimensional images.

(Overview of SLAM)

Here, an overview of the SLAM will be described. The SLAM according to the present embodiment may be interpreted as a technology for generating a three-dimensional model from a plurality of images which are captured consecutively by the same camera.

First, the model generating device 30 extracts feature points from a plurality of images. At this time, the model generating device 30 may perform feature point detection using, for example, scale invariant feature transform (SIFT) or speeded up robust features (SURF). Further, for example, the model generating device 30 may use Harris' corner detection technique or the like.

Then, matching of the feature point extracted from the respective image is performed. At this time, the model generating device 30 may perform matching corresponding to a technique used for the feature point detection. For example, in a case in which the SIFT or the SURF is used for the feature point detection, the model generating device 30 may perform the above matching on the basis of a feature quantity vector related to the detected feature point.

Then, the model generating device 30 calculates three-dimensional coordinates of the feature point on the basis of a matching result and calculates a camera parameter corresponding to each image from the three-dimensional coordinates of the feature point. Here, the camera parameter may be a degrees of freedom vector of the camera. In other words, the camera parameter according to the present embodiment may be position coordinates (X, Y, Z) of the camera and rotation angles ($\Phi_x$, $\Phi_y$, $\Phi_z$) of respective coordinate axes.

Further, the model generating device 30 may minimize a projection error on the basis of the calculated camera parameter. Specifically, the model generating device 30 is able to perform a statistical process of minimizing a position distribution of each camera parameter and each feature point.

The overview of the SLAM according to the present embodiment has been described above. The model generating device 30 according to the present embodiment is able to generate the three-dimensional model on the basis of the three-dimensional coordinates of the feature point obtained through the above-described process.

(Setting of Three-Dimensional Model Parameter)

Next, a setting of a three-dimensional model parameter according to the present embodiment will be described. The information processing device 10 according to the present embodiment is able to further set a three-dimensional model parameter related to the three-dimensional modeling performed by the model generating device 30. Here, the three-dimensional model parameter may be a parameter related to the SLAM described above. Specifically, the three-dimensional model parameter may include the number of feature points to be extracted, a matching threshold value of a feature point, a range of a feature point used for a camera parameter calculation, or the like.

The information processing device 10 according to the present embodiment is able to cause the model generating device 30 to generate the three-dimensional model on the basis of the setting of the three-dimensional model parameter and acquire the three-dimensional model. To this end, the information processing device 10 may include a setting region related to the three-dimensional model parameter in the user interface.

Figure 13:
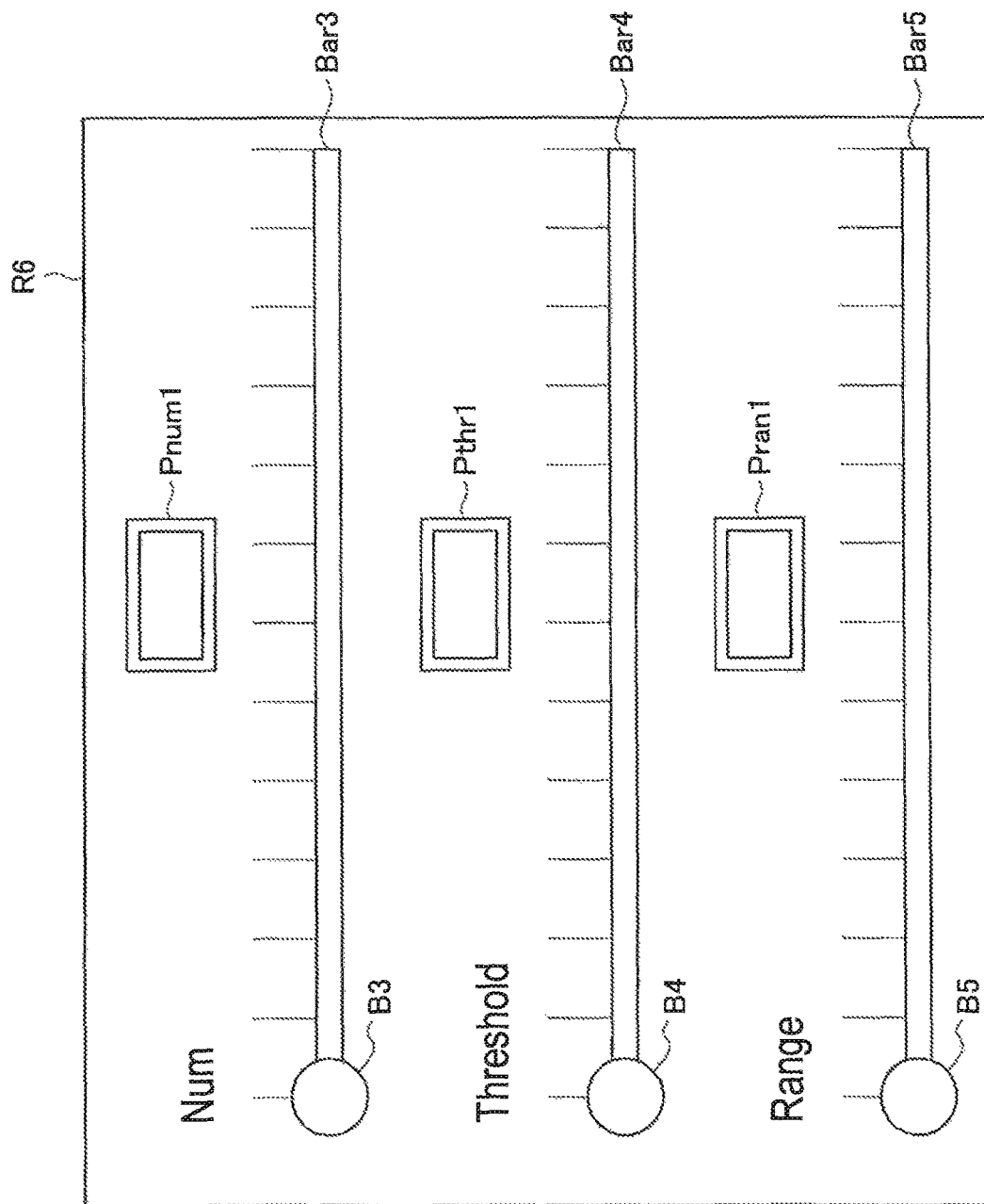
FIG. 13 is a display example of a three-dimensional model parameter setting region according to the embodiment.

FIG. 13 is a display example related to a three-dimensional model parameter setting region R6 according to the present embodiment. Referring to FIG. 13, an item Pum1, an item Pthr1, and an item Pran1 are displayed on the three-dimensional model parameter setting region R6. Bar3 to Bar5 for operating a value of a setting item and buttons B3 to B5 may be displayed on the setting items.

Here, the item Pum1 may be a setting item for designating the number of feature points to be extracted. The model generating device 30 may extract a feature point from an image on the basis of a value set to the item Pum1.

The item Pthr1 may be a setting item for setting a threshold value related to feature point matching when matching o images is performed. The model generating device 30 may perform feature point matching on the basis of a value set to the item Pthr1.

Further, the item Pran1 may be an item for setting the range of the feature point used for a calculation of the camera parameter. The model generating device 30 may calculate the camera parameter on the basis of a value set to the item Pran1.

The generation of the three-dimensional model by the SLAM according to the present embodiment has been described above. The information processing device 10 according to the present embodiment is able to execute the physical simulation using the three-dimensional model generated by the above technique and obtain a generated image that is closer to the real world.

<<2.6. Flow of Control According to First Embodiment>>

Figure 14:
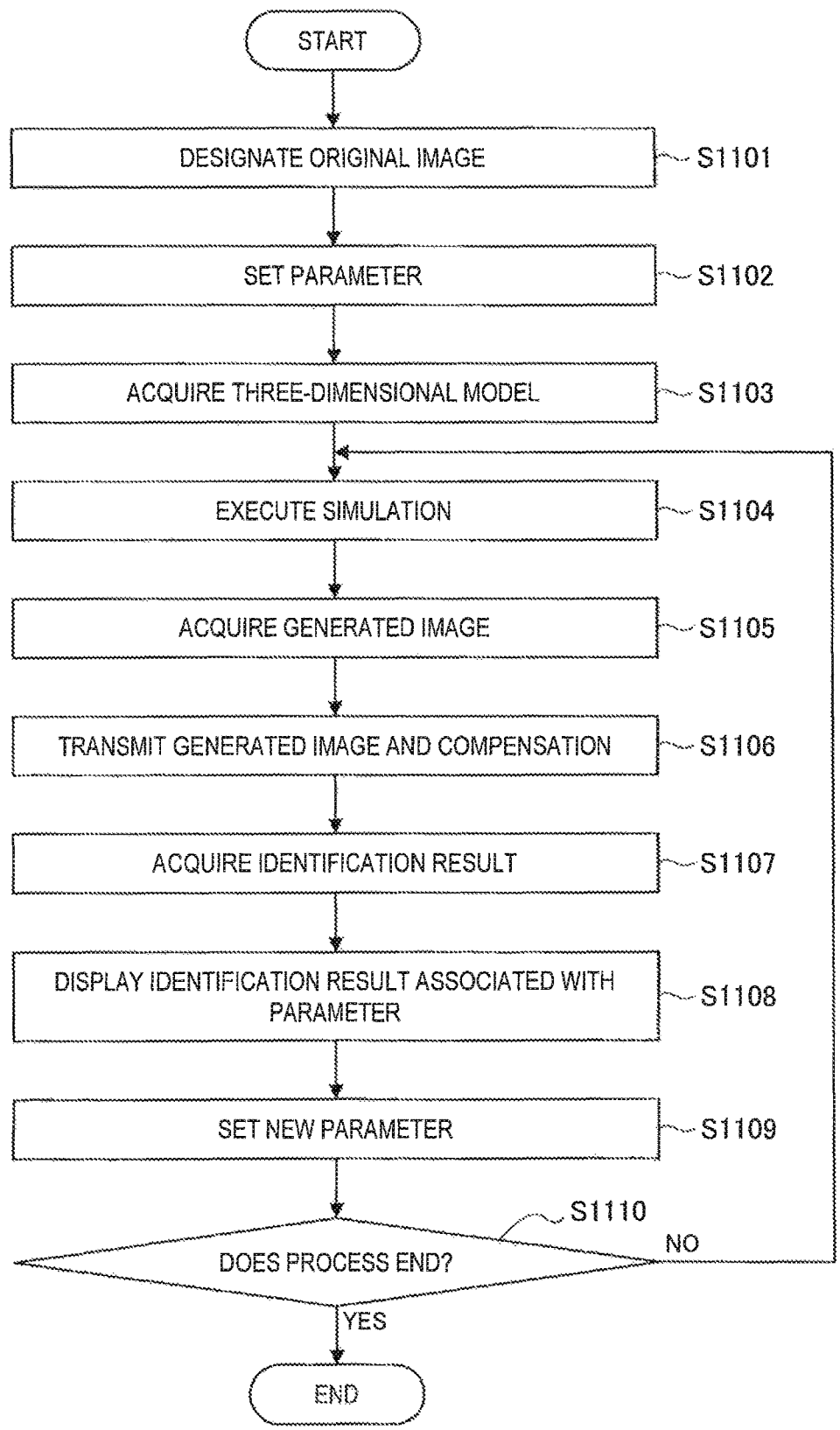
FIG. 14 is a flowchart illustrating the flow of control performed by the information processing device according to the embodiment.

Next, the flow of control according to the present embodiment will be described in detail. FIG. 14 is a flowchart illustrating the flow of control performed by the information processing device 10.

Referring to FIG. 14, first, the control unit 110 acquires information related to the original image designated by the user (S1101). At this time, the user may designate a plurality of original images in order to implement the three-dimensional model generation performed by the SLAM.

Then, the control unit 110 sets a parameter related to the physical simulation (S1102). At this time, the user may be able to change the parameter set by the control unit 110.

Then, the model acquiring unit 130 acquires the three-dimensional model on the basis of the original image designated in step S1101 and the three-dimensional model parameter set in step S1102 (S1103).

Then, the simulator unit 120 executes the physical simulation on the basis of the parameter set in step S1102 and the three-dimensional model acquired in step S1103 (S1104).

Then, the simulator unit 120 acquires the generated image on the basis of the parameter set in step S1102 (S1105). As described above, the generated image may be a two-dimensional CG image acquired on the basis of the physical simulation. Steps S1104 and S1105 may be executed in parallel.

Then, the communication unit 140 transmits the generated image acquired in step S1105 to the machine learning device 20 (S1107). Further, the communication unit 140 may transmit a compensation related to the generated image to the machine learning device 20. In this case, the machine learning device 20 is able to perform the reinforcement learning based on the received compensation.

Then, the communication unit 140 receives an identification result of the machine learning device 20 for the generated image transmitted in step S1107 (S1108).

Then, the control unit 110 displays the identification result received in step S1108 and the parameter set in step S1102 in association with each other (S1109).

Then, the control unit 110 sets a new parameter on the basis of the identification result acquired in step S1107. At this time, the user may be able to change the parameter set by the control unit 110.

Then, the control unit 110 determines whether or not the process ends (S1110). At this time, the control unit 110 may determine whether or not the process ends on the basis of an operation performed by the user.

Here, in a case in which the control unit 110 ends the process (Yes in step S1110), the information processing device 10 may end a series of processes and transitions to a standby state. On the other hand, if the process does not end (No in step S1110), the information processing device 10 may repeatedly perform the process of steps S1104 to S1110.

The flow of control performed by the information processing device 10 according to the present embodiment has been described above. In the above description, the case in which the parameter is changed by the user has been described as an example, but the information processing device according to the present embodiment may repeat the process of steps S1104 to S1110 automatically after designating the original image. The information processing device 10 according to the present embodiment is able to cause the machine learning device 20 to perform continuous learning by repeating the above-described process. In other words, the information processing device 10 according to the present embodiment is able to continue to efficiently improve the generalization performance of the machine learning device 20 by repeating the image generation based on the identification result.

3. Second Embodiment

<<3.1. System Configuration According to Second Embodiment>>

Next, a second embodiment according to the present disclosure will be described. In the second embodiment of the present disclosure, the machine learning device 20 may have the interface control function F1. In the second embodiment, the information processing device 10 may be a physical simulator including the physical simulator function F3. In other words, in the second embodiment according to the present disclosure, the machine learning device 20 is able to control the user interface and acquire the generated image obtained by the physical simulation performed by the information processing device 10.

The system according to the present embodiment may include a machine learning device 20, an information processing device 10, and a model generating device 30. Further, the devices are connected via the network 40 so that they are able to perform communication with each other.

(Machine Learning Device 20)

As described above, the machine learning device 20 according to the second embodiment may be an information processing device having the interface control function F1 and the machine learning function F2. In other words, the machine learning device 20 according to the present embodiment may be a learning device having a function providing the user interface for performing the image generation and the learning control related to the machine learning.

(Information Processing Device 10)

The information processing device 10 according to the present embodiment may be a physical simulator having the physical simulator function F3. The information processing device 10 according to the present embodiment has a function of performing the physical simulation on the basis of the parameter received from the machine learning device 20 and transmitting a generated image obtained by the physical simulation to the machine learning device 20.

The system configuration example according to the present embodiment has been described above. The model generating device 30 according to the present embodiment may have a function equivalent to that of the model generating device 30 according to the first embodiment, and thus description thereof will be omitted.

<<3.2. Machine Learning Device 20 According to Second Embodiment>>

Figure 15:
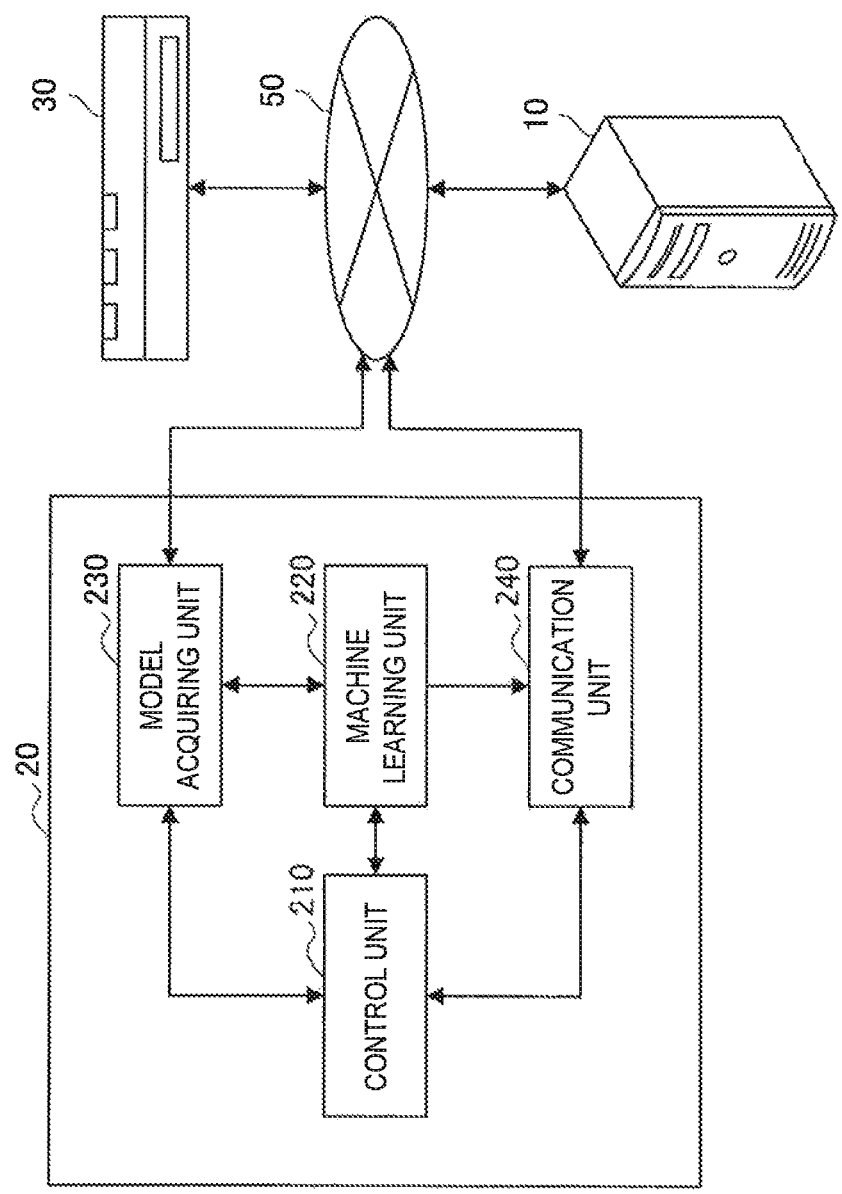
FIG. 15 is a functional block diagram of a machine learning device according to a second embodiment of the present disclosure.

Next, the machine learning device 20 according to the present embodiment will be described. FIG. 15 is a functional block diagram of the machine learning device 20 according to the present embodiment. Referring to FIG. 15, the machine learning device 20 according to the present embodiment includes a control unit 210, a machine learning unit 220, a model acquiring unit 230, and a communication unit 240. The following description will proceed focusing on differences from the first embodiment, and description of duplicated functions will be omitted.

(Control Unit 210)

The control unit 210 has a function of controlling display related to setting of a parameter related to the physical simulation. Further, the control unit 210 has a function of causing a learning result of the machine learning unit 220 for the generated image acquired from the information processing device 10 and the parameter to be displayed on a connected display unit (not illustrated) in association with each other.

(Machine Learning Unit 220)

The machine learning unit 220 has a function of performing the machine learning on the basis of the generated image obtained in the physical simulation performed by the information processing device 10.

(Communication Unit 240)

The communication unit 240 has a function of performing communication between the information processing device 10 and the model generating device 30. For example, the communication unit 240 is able to transmit the parameter set by the control unit 210 to the information processing device 10. Further, the communication unit 240 is able to receive the generated image obtained in the physical simulation from the information processing device 10.

The respective components of the machine learning device 20 according to the present embodiment has been described above. The model acquiring unit 230 may have a function equivalent to that of the model acquiring unit 130 according to the first embodiment, and thus description thereof is omitted.

<<3.3. Display of Learning Result According to Second Embodiment>>

Next, display of a learning result according to the present embodiment will be described. As described above, the control unit 210 of the machine learning device 20 is able to cause the parameter related to the generated image and the learning result of the machine learning unit 220 for the generated image to be displayed in association with each other.

FIG. 16 is a display example of a learning result display region R7 according to the present embodiment. Referring to FIG. 16, generated images GI11 to GI13, parameter values associated with the generated images GI11 to GI13, and teaming results of the machine learning unit 220 for the generated images GI11 to GI13 are displayed on the learning result display region R7.

In the example illustrated in FIG. 16, the learning result is displayed using "0" or "1," but the control unit 210 may cause, for example, an image reconstructed on the basis of the generated image by the machine learning unit 220 to be displayed on the learning result display region R7. Further, in the example illustrated in FIG. 16, a value of a single parameter P1 related to the generated image is displayed, but the control unit 210 may cause a plurality of parameters to be displayed in association with the learning result.

Figure 17:
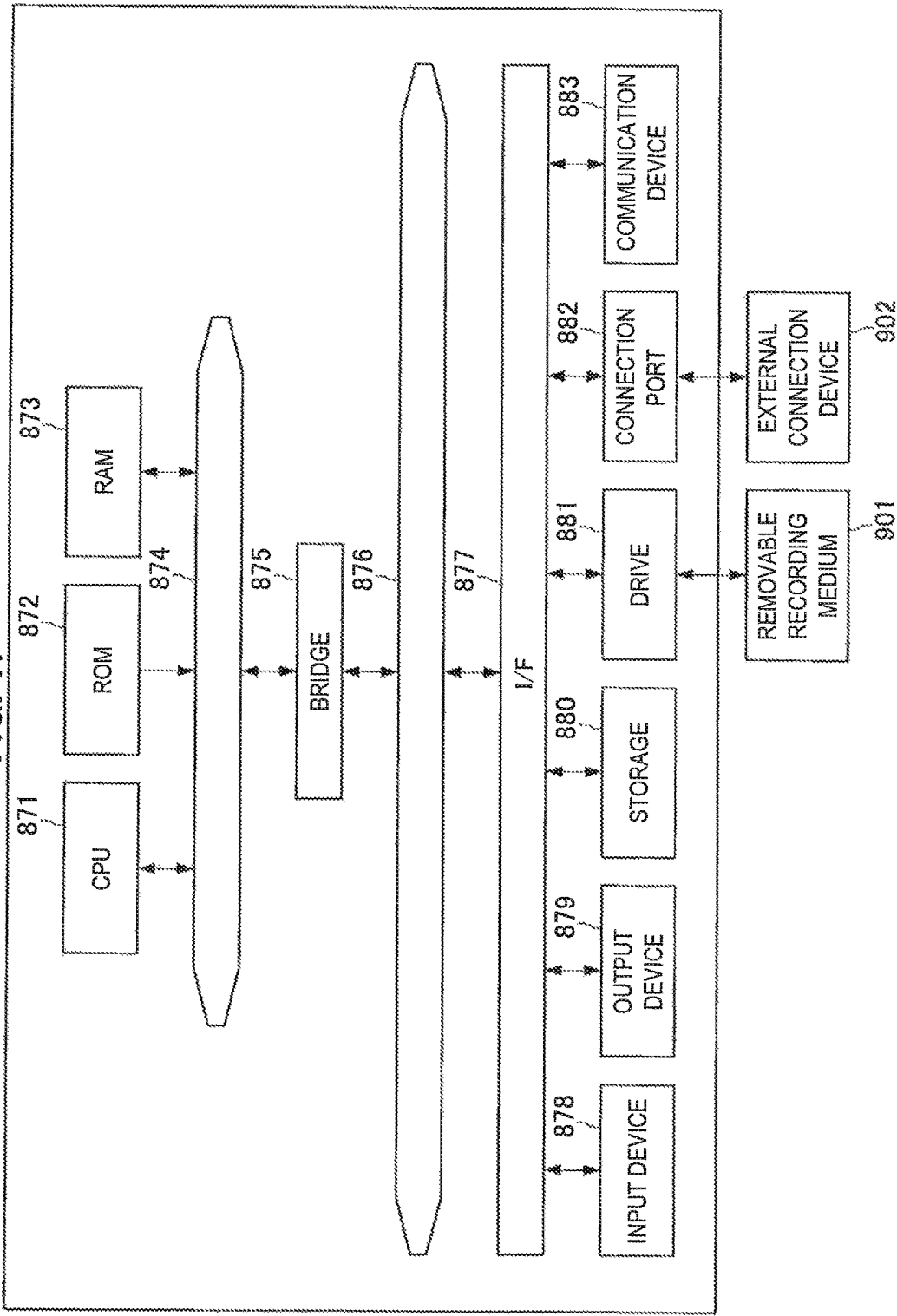
FIG. 17 is a hardware configuration example according to the present disclosure.

Further, the learning result display region R7 according to the present embodiment is not limited to the example illustrated in FIG. 17, and various learning results may be displayed. For example, the control unit 210 is able to compare and display learning results obtained by a plurality of neural networks having different network structures. Further, the control unit 210 is able to cause the parameter associated with the generated image and the training result and the validation result for the generated image to be displayed in association with each other.

Further, the control unit 210 may cause a learning progress performed by the machine learning unit 220 and the parameter value to be displayed in association with each other. At this time, for example, the control unit 210 is able to indicate a learning error, a training error, or the like for a predetermined parameter value using a learning curve.

The second embodiment related to the present disclosure has been described above. As described above, the control unit 210 according to the present embodiment is able to cause the parameter value related to the generated image and the learning result for the generated image to be displayed in association with each other. The user is able to check the learning result display region R7 and understand a parameter region which is difficult for the machine learning unit 220 to recognize. Further, the user may check the learning result of the machine learning unit 220 and perform control related to various machine learnings. For example, the user may change the network structure of the machine learning unit 220 on the same user interface. According to the machine learning device 20 according to the present embodiment, it is possible to remarkably improve the work efficiency of the user related to the machine learning control.

4. Hardware Configuration Example

Next, a hardware configuration example common to the information processing device 10, the machine learning device 20, and the model generating device 30 according to the present disclosure will be described. FIG. 17 is a block diagram illustrating a hardware configuration example of each of the information processing device 10, the machine learning device 20, and the model generating device 30 according to the present disclosure. Referring to 17, each of the information processing device 10, the machine learning device 20, and the model generating device 30 includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. The hardware configuration described here is an example, and some components may be omitted. A component other than components described here may be further added.

(CPU 871)

The CPU 871 functions as, for example, an operation processing device or a control device and controls operations of all or some of the components on the basis of various kinds of programs recorded in the ROM 872, the RAM 873, the storage 880, or a removable recording medium 901.

(ROM 872 and RAM 873)

The ROM 872 is a device that stores programs read by the CPU 871, data used for operations, and the like. For example, a program read by the CPU 871, various kinds of parameters that appropriately change when the program is executed, and the like are temporarily or permanently stored in the RAM 873.

(Host Bus 874, Bridge 875, External Bus 876, and Interface 877)

For example, the CPU 871, the ROM 872, and the RAM 873 are connected to one another the host bus 874 capable of performing high-speed data transmission. On the other hand, for example, the host bus 874 is connected to an external bus 876 having a relatively low data transmission speed via the bridge 875. Further, the external bus 876 is connected to various components via the interface 877.

(Input Device 878)

Examples of the input device 878 include a mouse, a keyboard, a touch panel, a button, a switch, and a lever. Further, a remote controller capable of transmitting a control signal using infrared rays or other radio waves (hereinafter referred to as a remote controller) may be used as the input device 878.

(Output Device 879)

The output device 879 is a device which is capable of notifying the user of acquired information visually or audibly such as, for example, a display device such as a cathode ray tube (CRT), an LCD, or an organic EL, an audio output device such as a speaker or a headphone, a printer, a mobile phone, a facsimile.

(Storage 880)

The storage 880 is a device that stores various kinds of data. Examples of the storage 880 include a magnetic storage device such as a hard disk drive (HDD), a semiconductor storage device, an optical storage device, and a magneto-optical storage device.

(Drive 881)

The drive 881 is a device that reads out information recorded in the removable recording medium 901 such as a magnetic disk, an optical disk, a magneto-optical disk, a semiconductor memory, or the like or writes information in the removable recording medium 901.

(Removable Recording Medium 901)

Examples of the removable recording medium 901 include a DVD medium, a Blu-ray® medium, an HD DVD medium, and various kinds of semiconductor storage media. It will be appreciated that the removable recording medium 901 may be, for example, an IC card in which a non-contact type IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, and an IC recorder.

(Communication Device 883)

The communication device 883 is a communication device that establishes a connection with the network, and examples of the communication device 883 include a communication card for wired or wireless LAN, Bluetooth®, or wireless USB (WUSB), an optical communication router, an asymmetric digital subscriber line (ADSL) router, and various kinds of communication modems.

5. Conclusion

As described above, the information processing device 10 according to the present disclosure may have a function of providing the user interface for controlling an input and an output between the machine learning device 20 and the model generating device 30 and performing the image generation and the learning control related to the machine learning Function. Further, the information processing device 10 may have the physical simulation function of generating an image related to the machine learning. Further, the machine learning device 20 according to the present disclosure may be a learning device having a function of providing the user interface for performing the image generation and the learning control related to the machine learning. According to this configuration, it is possible to further improve the generalization performance of the neural network.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above embodiments have been described focusing on the example related to the image recognition, but the technology is not limited to this example. The technology according to the present disclosure can also be applied to, for example, machine learning related to machine tools, surgical robots, pathological diagnosis, and agricultural harvesting.

For example, in a case in which the machine learning related to the machine tools is performed, when environments which are difficult for a machine vision to recognize are incorporated into the physical simulator, it is possible to generate two-dimensional CG images in which various environmental conditions are reproduced and implement, for example, control learning according to a corresponding environmental condition.

Further, for example, in a case in which the machine learning related to the surgical robots is performed, when environments in which it is difficult to recognize organs or surgical tools are incorporated into the physical simulator, it is possible to generate two-dimensional CG images in which reactions or illumination of organs are changed and implement control learning according to various situations.

Further, for example, in a case in which the machine learning related to the pathological diagnosis is performed, when pathological slides are incorporated into the physical simulator, it is possible to generate two-dimensional CG images in which dyeing intensities are changed and implement, for example, cancer determination learning corresponding to various specimens.

Further, for example, in a case in which the machine learning related to the agricultural harvesting is performed, it is possible to implement the learning related to the agricultural harvest by incorporating sensor information acquired from various kinds of sensors into the physical simulator and performing learning for the sensor information and an output result.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a control unit configured to control display related to a setting of a parameter related to physical simulation; and a communication unit configured to transmit image information associated with the parameter obtained in the physical simulation to a machine learning unit and receive a determination result based on the image information from the machine learning unit, in which the control unit causes a display unit to display the determination result and the parameter in association with each other.

(2)

The information processing device according to (1), in which the setting of the parameter includes a parameter range indicating a range of a value of the parameter, and the control unit causes the display unit to display the determination result and the parameter range in association with each other.

(3)

The information processing device according to (2), in which the setting of the parameter further includes division information related to the parameter range, the control unit further causes the display unit to display the determination result and the division information in association with each other, and the image information is acquired on the basis of the parameter range and the division information.

(4)

The information processing device according to (2) or (3), in which the control unit sets a new parameter on the basis of the determination result, and causes the display unit to display the determination result and the new parameter in association with each other.

(5)

The information processing device according to (4), in which the determination result is true-false information of determination on the image information, the control unit sets a new parameter range on the basis of a determination result indicating an erroneous determination, and the new parameter range includes a value of the parameter associated with the determination result indicating the erroneous determination and is narrower than the parameter range associated with the determination result.

(6)

The information processing device according to (5), in which the control unit controls display such that the determination result indicating the erroneous determination is enlarged.

(7)

The information processing device according to any of (4) to (6), in which the control unit sets a new parameter range that does not include the parameter range associated with the determination result.

(8)

The information processing device according to any of (1) to (7), in which the control unit causes the display unit to display the determination result together with an indicator related to a value of the parameter.

(9)

The information processing device according to any of (1) to (8), in which the parameter is set or changed by a user.

(10)

The information processing device according to any of (1) to (9), in which the control unit further causes the determination result and an image generated on the basis of the image information to be displayed in association with each other.

(11)

The information processing device according to any of (1) to (10), further including:

a simulator unit configured to perform the physical simulation.

(12)

The information processing device according to (11), further including:

a model acquiring unit configured to acquire a three-dimensional model generated from a two-dimensional image, in which the simulator unit performs the physical simulation using the three-dimensional model generated from the two-dimensional image.

(13)

The information processing device according to (12), in which the model acquiring unit acquires a three-dimensional model generated by SLAM.

(14)

The information processing device according to (13), in which the parameter related to the physical simulation further includes a three-dimensional model parameter, the model acquiring unit acquires the three-dimensional model on the basis of the three-dimensional model parameter, and the three-dimensional model parameter includes at least one of the number of feature points to be extracted, a matching threshold value of a feature point, and a range of a feature point used for a camera parameter calculation.

(15)

The information processing device according to any of (12) to (14), in which the control unit causes the display unit to display at least one of the two-dimensional image, an image generated on the basis of the image information, and an execution image of the physical simulation.

(16)

The information processing device according to any of (1) to (15), in which the communication unit transmits a compensation related to the image information to the machine learning unit.

(17)

The information processing device according to any of (1) to (16), in which the communication unit receives a plurality of the determination results determined by a plurality of neural networks having different network structures.

(18)

An information processing device including:

a control unit configured to control display related to a setting of a parameter related to physical simulation;

a communication unit configured to transmit the parameter to a physical simulator and receive image information obtained in the physical simulation from the physical simulator; and a machine learning unit configured to perform machine learning on the basis of the image information, in which the control unit causes a display unit to display a learning result obtained by the machine learning unit and the parameter in association with each other.

REFERENCE SIGNS LIST 10 information processing device
110 control unit
120 simulator unit
130 model acquiring unit
140 communication unit
20 machine learning device
210 control unit
220 machine learning unit
230 model acquiring unit
240 communication unit
30 model generating device

The invention claimed is:

1. An information processing device comprising:
a control unit configured to control display related to a setting of a parameter related to physical simulation; and
a communication unit configured to transmit image information associated with the parameter obtained in the physical simulation to a machine learning unit and receive a determination result based on the image information from the machine learning unit, wherein the setting of the parameter includes a parameter range indicating a range of a numerical value of the parameter, the range having an upper bound and a lower bound, and wherein the control unit causes a display unit to display the determination result and the parameter range, including the upper bound and the lower bound, in visual association with each other.

2. The information processing device according to claim 1, wherein the setting of the parameter further includes division information related to the parameter range, the control unit further causes the display unit to display the determination result and the division information in visual association with each other, and the image information is acquired on the basis of the parameter range and the division information.

3. The information processing device according to claim 1, wherein the control unit sets a new parameter on the basis of the determination result, and causes the display unit to display the determination result and the new parameter in visual association with each other.

4. The information processing device according to claim 3, wherein the determination result is true-false information of determination on the image information, the control unit sets a new parameter range on the basis of a determination result indicating an erroneous determination, and the new parameter range includes a numerical value of the parameter associated with the determination result indicating the erroneous determination and is narrower than the parameter range associated with the determination result.

5. The information processing device according to claim 4, wherein the control unit controls display such that the determination result indicating the erroneous determination is enlarged.

6. The information processing device according to claim 3, wherein the control unit sets a new parameter range that does not include the parameter range associated with the determination result.

7. The information processing device according to claim 1, wherein the control unit causes the display unit to display the determination result together with an indicator related to a numerical value of the parameter.

8. The information processing device according to claim 1, wherein the parameter is set or changed by a user.

9. The information processing device according to claim 1, wherein the control unit further causes the determination result and an image generated on the basis of the image information to be displayed in visual association with each other.

10. The information processing device according to claim 1, further comprising:

a simulator unit configured to perform the physical simulation.

11. The information processing device according to claim 10, further comprising:

a model acquiring unit configured to acquire a three-dimensional model generated from a two-dimensional image, wherein the simulator unit performs the physical simulation using the three-dimensional model generated from the two-dimensional image.

12. The information processing device according to claim 11, wherein the model acquiring unit acquires a three-dimensional model generated by SLAM.

13. The information processing device according to claim 12, wherein the parameter related to the physical simulation further includes a three-dimensional model parameter, the model acquiring unit acquires the three-dimensional model on the basis of the three-dimensional model parameter, and the three-dimensional model parameter includes at least one of the number of feature points to be extracted, a matching threshold value of a feature point, and a range of a feature point used for a camera parameter calculation.

14. The information processing device according to claim 11, wherein the control unit causes the display unit to display at least one of the two-dimensional image, an image generated on the basis of the image information, and an execution image of the physical simulation.

15. The information processing device according to claim 1, wherein the communication unit transmits a compensation related to the image information to the machine learning unit.

16. The information processing device according to claim 1, wherein the communication unit receives a plurality of the determination results determined by a plurality of neural networks having different network structures.

17. An information processing device comprising:

a control unit configured to control display related to a setting of a parameter related to physical simulation;

a communication unit configured to transmit the parameter to a physical simulator and receive image information obtained in the physical simulation from the physical simulator; and a machine learning unit configured to perform machine learning on the basis of the image information, wherein the setting of the parameter includes a parameter range indicating a range of a numerical value of the parameter, the range having an upper bound and a lower bound, and wherein the control unit causes a display unit to display a learning result obtained by the machine learning unit and the parameter range, including the upper bound and the lower bound, in visual association with each other.

18. The information processing device according to claim 1, wherein the communication unit transmits a larger amount of image information associated with a sub-range, of the parameter range, within which the machine learning unit has increased difficulty in identifying an image as compared to other sub-ranges of the parameter range.

19. The information processing device according to claim 1, wherein the control unit causes the display unit to display the parameter and the parameter range, associated with image generation and learning control, upon a same user interface simultaneously in time with the displaying of the determination result.

* * * * *